US010836207B2

(12) United States Patent
Van Houten et al.

(10) Patent No.: US 10,836,207 B2
(45) Date of Patent: Nov. 17, 2020

(54) METHOD OF FORMING A WHEEL ASSEMBLY

(71) Applicant: Lacks Wheel Trim Systems, LLC, Kentwood, MI (US)

(72) Inventors: Garry Van Houten, Middleville, MI (US); Gerald Nuiver, Hudsonville, MI (US); Mitch Brummel, Middleville, MI (US)

(73) Assignee: LACKS WHEEL TRIM SYSTEMS, LLC, Kentwood, MI (US)

( * ) Notice: Subject to any disclaimer, the term of this patent is extended or adjusted under 35 U.S.C. 154(b) by 0 days.

(21) Appl. No.: 15/938,744

(22) Filed: Mar. 28, 2018

(65) Prior Publication Data

US 2018/0281509 A1 Oct. 4, 2018

Related U.S. Application Data

(60) Provisional application No. 62/477,690, filed on Mar. 28, 2017.

(51) Int. Cl.
*B32B 41/00* (2006.01)
*B60B 7/02* (2006.01)
(Continued)

(52) U.S. Cl.
CPC ............ *B60B 7/02* (2013.01); *B60B 3/02* (2013.01); *B60B 3/044* (2013.01); *B60B 3/14* (2013.01);
(Continued)

(58) Field of Classification Search
CPC .. B60B 7/02; B60B 7/061; B60B 7/00; B60B 3/02; B60B 3/044; B60B 11/02;
(Continued)

(56) References Cited

U.S. PATENT DOCUMENTS 5,664,845 A * 9/1997 Maloney ............... B60B 7/00
301/37.36
9,707,800 B2 7/2017 Stratton et al.
(Continued)

FOREIGN PATENT DOCUMENTS

CH 658224 A5 10/1986
DE 3503882 A1 10/1986
(Continued)

OTHER PUBLICATIONS

International Preliminary Report on Patentability, PCT/US2018/024917, dated Oct. 1, 2019.

*Primary Examiner* — Michael N Orlando
*Assistant Examiner* — Joshel Rivera
(74) *Attorney, Agent, or Firm* — Dickinson Wright PLLC

(57) ABSTRACT

Disclosed is a method of forming a wheel assembly consisting of a wheel portion and a cover portion. The method includes handling the wheel portion from dunnage to a work cell with an outboard face of the wheel portion facing away from a supporting surface. Next, determining a planar position and a rotational position of wheel portion and retrieving the cover portion. The method proceeds with applying an adhesive to at least one of the back side of the cover portion and the outboard face of the wheel portion. Then, aligning the cover portion with the wheel portion utilizing the planar position and the rotational position. The next step is engaging the cover portion and the wheel portion with one another and maintaining the wheel portion in engagement with the cover portion for a predetermined amount of time with a predetermined amount of pressure to form the wheel assembly.

20 Claims, 21 Drawing Sheets

(51) Int. Cl.
  *B60B 3/02* (2006.01)
  *B60B 3/04* (2006.01)
  *B60B 11/02* (2006.01)
  *B60B 3/14* (2006.01)
  *B60B 7/00* (2006.01)
  *B60B 7/06* (2006.01)
  *B60B 23/00* (2006.01)
  *B60B 31/00* (2006.01)

(52) U.S. Cl.
  CPC ............... *B60B 7/00* (2013.01); *B60B 7/061* (2013.01); *B60B 11/02* (2013.01); *B60B 7/0066* (2013.01); *B60B 23/00* (2013.01); *B60B 31/00* (2013.01); *B60B 2310/318* (2013.01); *B60B 2900/572* (2013.01)

(58) Field of Classification Search
  CPC ..... B60B 3/14; B60B 2900/572; B60B 23/00; B60B 31/00; B60B 2310/318; B60B 7/0066

USPC ................... 156/60, 64, 350, 351, 378, 379
  See application file for complete search history.

(56) References Cited

U.S. PATENT DOCUMENTS

| | | |
|---|---|---|
| 2005/0242656 A1 | 11/2005 | Hogan |
| 2013/0081765 A1* | 4/2013 | Lawson ................. B60C 25/05 157/1.17 |

FOREIGN PATENT DOCUMENTS

| | | |
|---|---|---|
| DE | 19943714 A1 | 4/2001 |
| DE | 102013107394 A1 | 1/2015 |
| JP | 2004345490 A | 12/2004 |

\* cited by examiner

US 10,836,207 B2

METHOD OF FORMING A WHEEL ASSEMBLY

CROSS-REFERENCE TO RELATED APPLICATIONS

The present application claims priority to U.S. Provisional Patent Application Ser. No. 62/477,690, filed Mar. 28, 2017 and entitled "Method of Forming a Wheel Assembly", which is hereby incorporated by reference as though set forth fully herein.

FIELD

This invention relates to methods of forming a wheel assembly consisting of a wheel portion and at least one cover portion.

BACKGROUND

Attempts have been made to provide improved wheel aesthetics by attaching mechanical inserts to the wheel. These are generally undesirable as the attachment process can be labor intensive and expensive. Additionally, the inserts also have durability issues as they can become easily detached from the wheel. Moreover, these inserts typically are configured as multiple pieces that must each be separately attached to the wheel. Another attempt to improve wheel aesthetics involves painting the outboard wheel surface. Again, such processes have limitations as they can be expensive and labor intensive. It would thus be desirable to provide a method of forming a wheel assembly that provides improved durability at a low cost with minimum labor requirements.

SUMMARY

This section provides a general summary of the present disclosure and is not a comprehensive disclosure of its full scope or all of its features, aspects and/or objectives.

Accordingly, it is an aspect of the present disclosure to provide a method of forming a wheel assembly consisting of a wheel portion having an outboard face and an inboard face opposite the outboard face and at least one cover portion having a front side and a back side opposite the front side. The method can include the step of handing the wheel portion from dunnage to a work cell with the wheel portion oriented with the outboard face of the wheel portion facing away from a supporting surface of the work cell. Next, determining a planar position and a rotational position of the wheel portion on the supporting surface and retrieving the at least one cover portion. The method can proceed with applying an adhesive to at least one of the back side of the at least one cover portion and the outboard face of the wheel portion. Then, the method can include the step of aligning the at least one cover portion with the wheel portion utilizing the planar position and the rotational position. The next step of the method can include engaging the at least one cover portion and the wheel portion with one another and maintaining the wheel portion in engagement with the at least one cover portion for a predetermined amount of time with a predetermined amount of pressure to form the wheel assembly. The method can conclude by moving the wheel assembly from the work cell.

These and other aspects and areas of applicability will become apparent from the description provided herein. The description and specific examples in this summary are intended for purpose of illustration only and are not intended to limit the scope of the present disclosure.

DRAWINGS

The drawings described herein are for illustrative purposes only of selected aspects and not all possible or anticipated implementations thereof, and are not intended to limit the scope of the present disclosure.

DETAILED DESCRIPTION

In the following description, details are set forth to provide an understanding of the present disclosure. In some instances, certain systems, structures and techniques have not been described or shown in detail in order not to obscure the disclosure.

Figure 1:
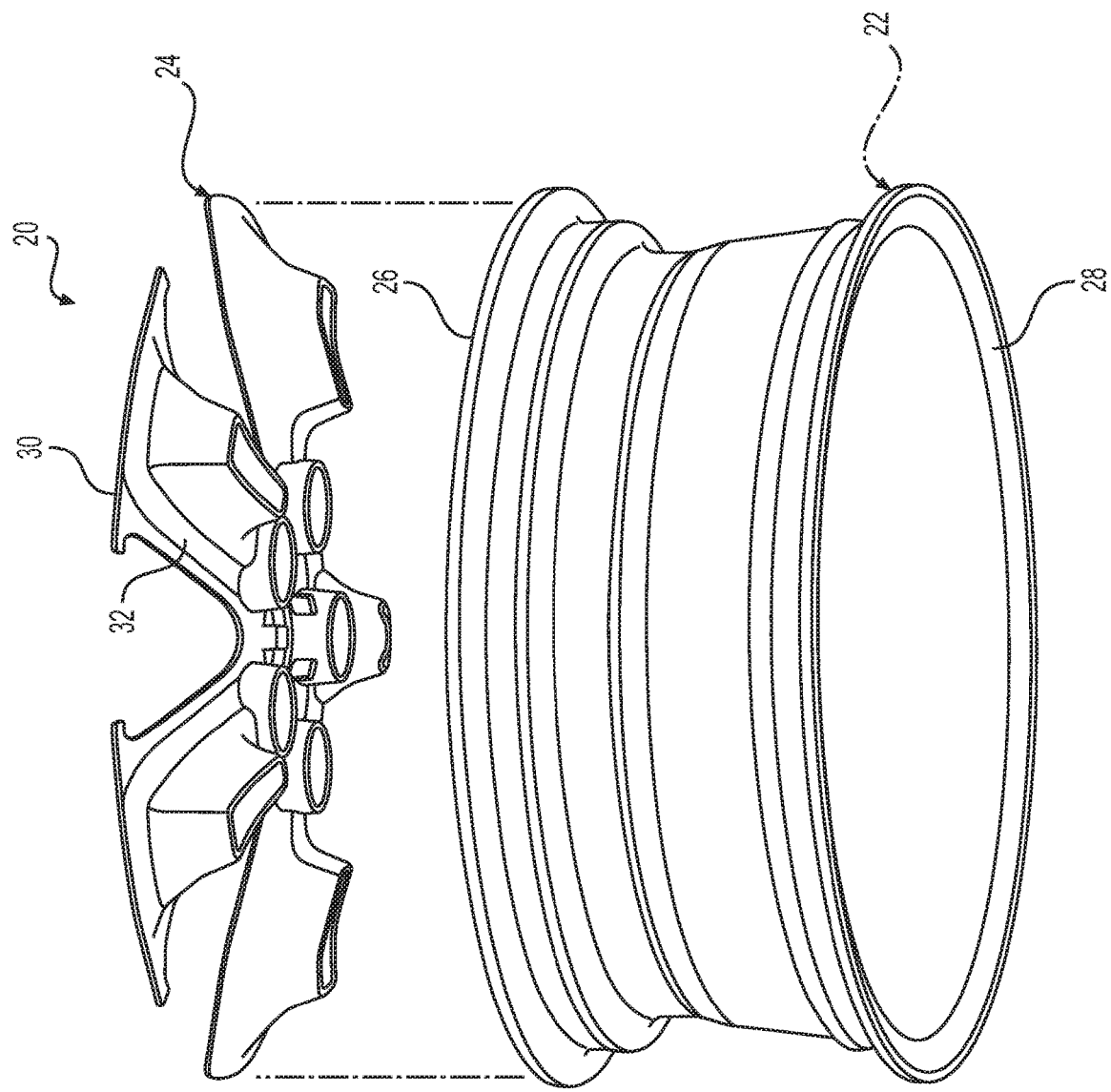
FIG. 1 is an exploded perspective view of a wheel portion and cover portion of a wheel assembly according to aspects of the disclosure.
Figure 2:
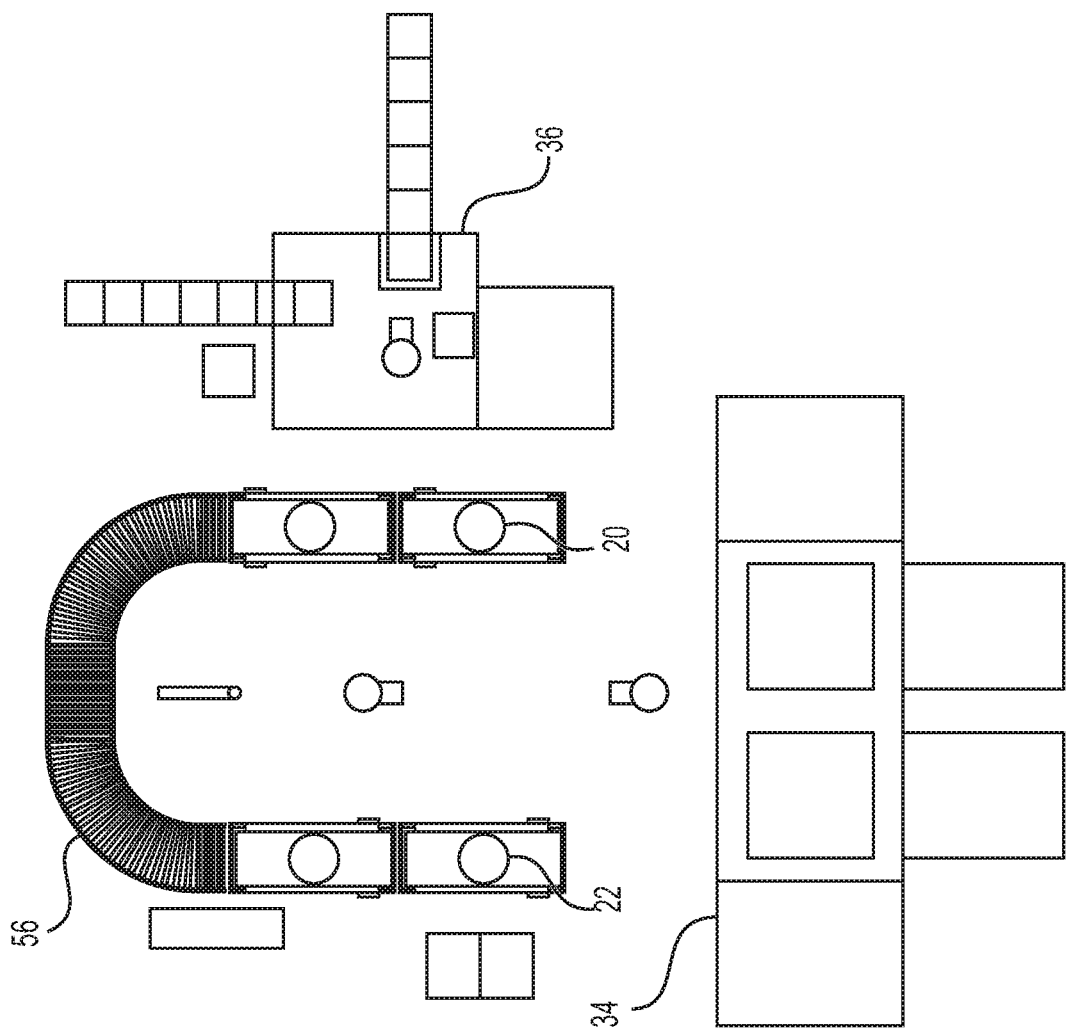
FIGS. 2-10 illustrate assembly lines for forming a wheel assembly according to aspects of the disclosure.
Figure 3:
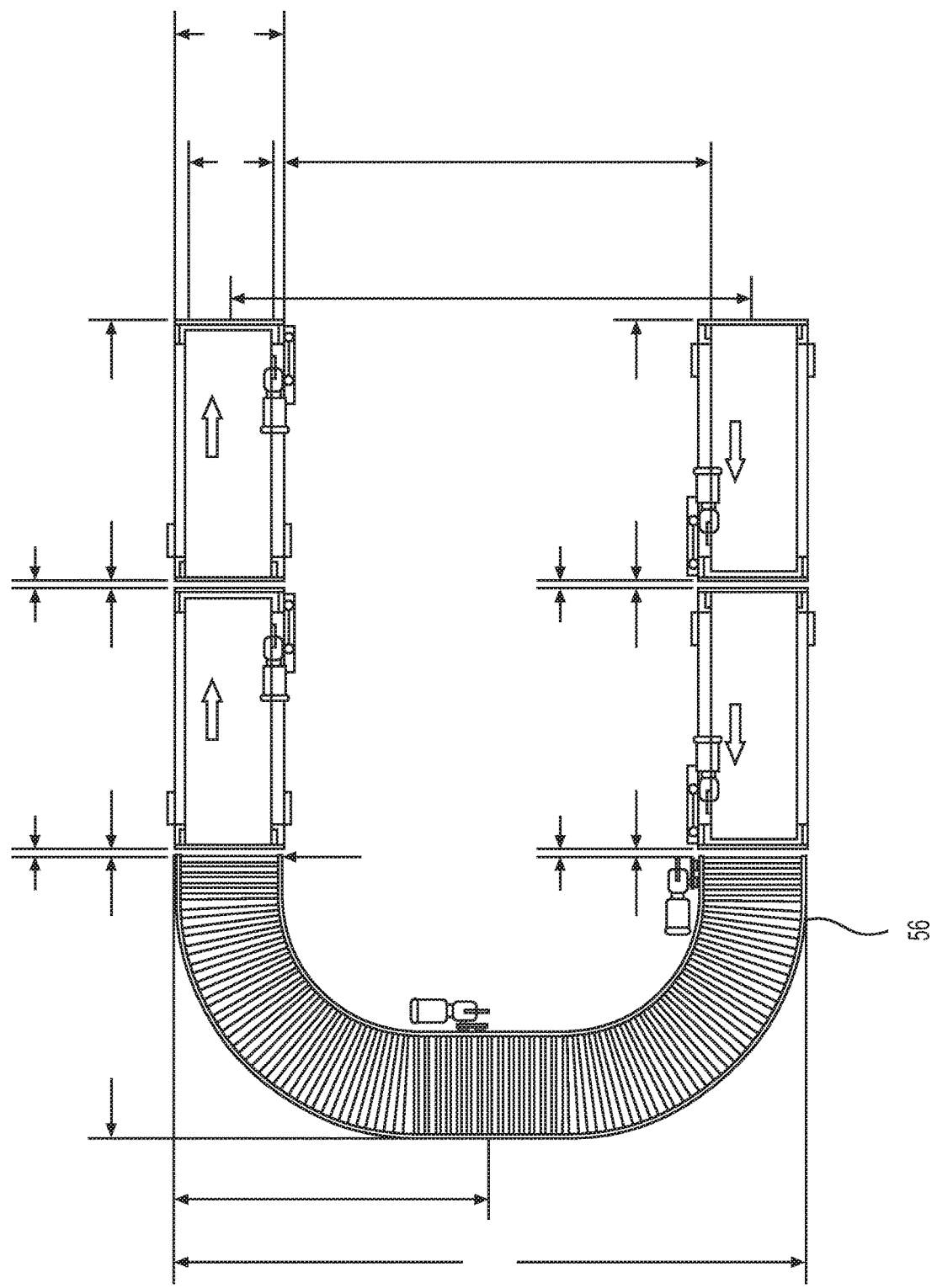
Figure 4:
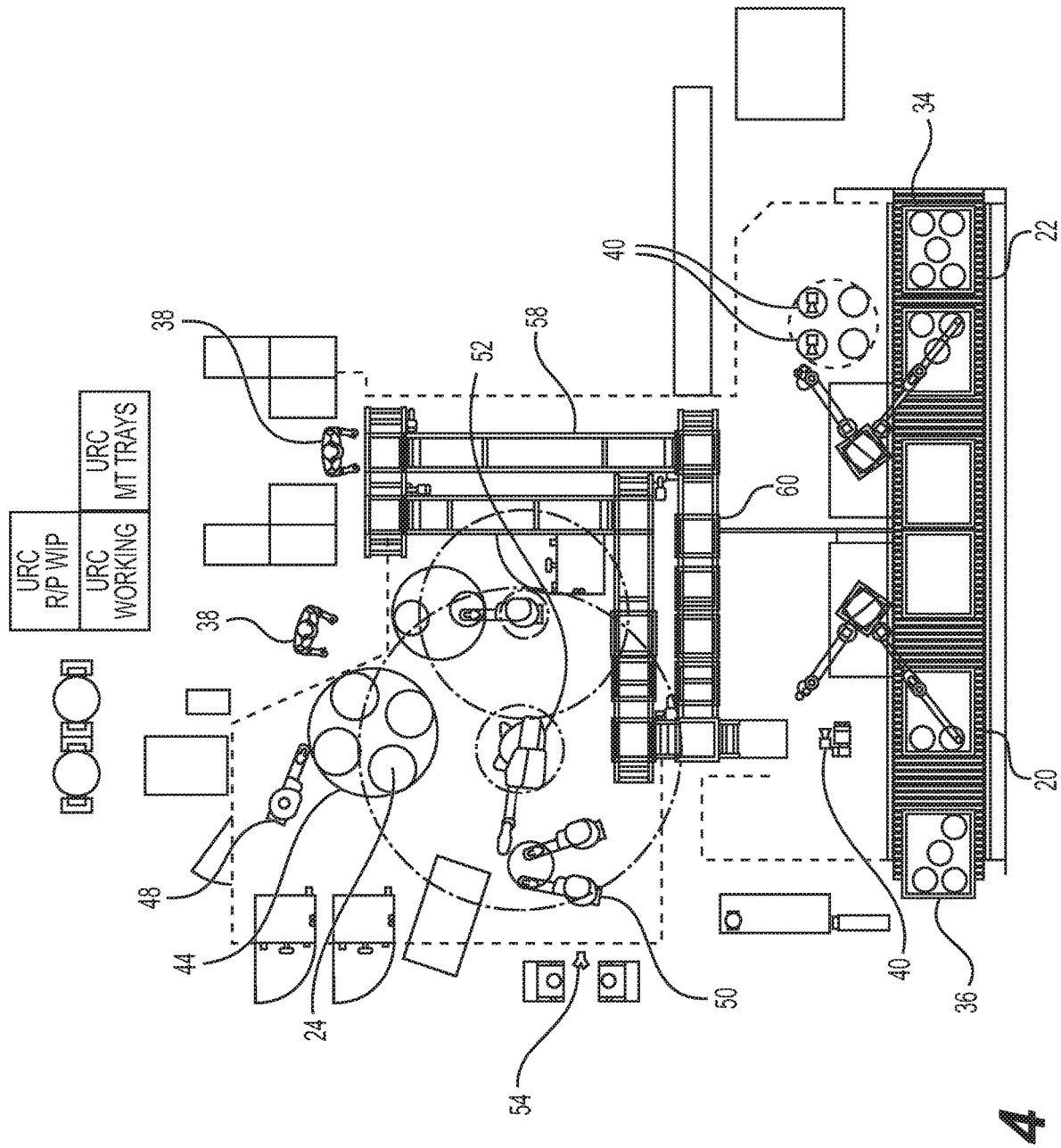
Figure 5:
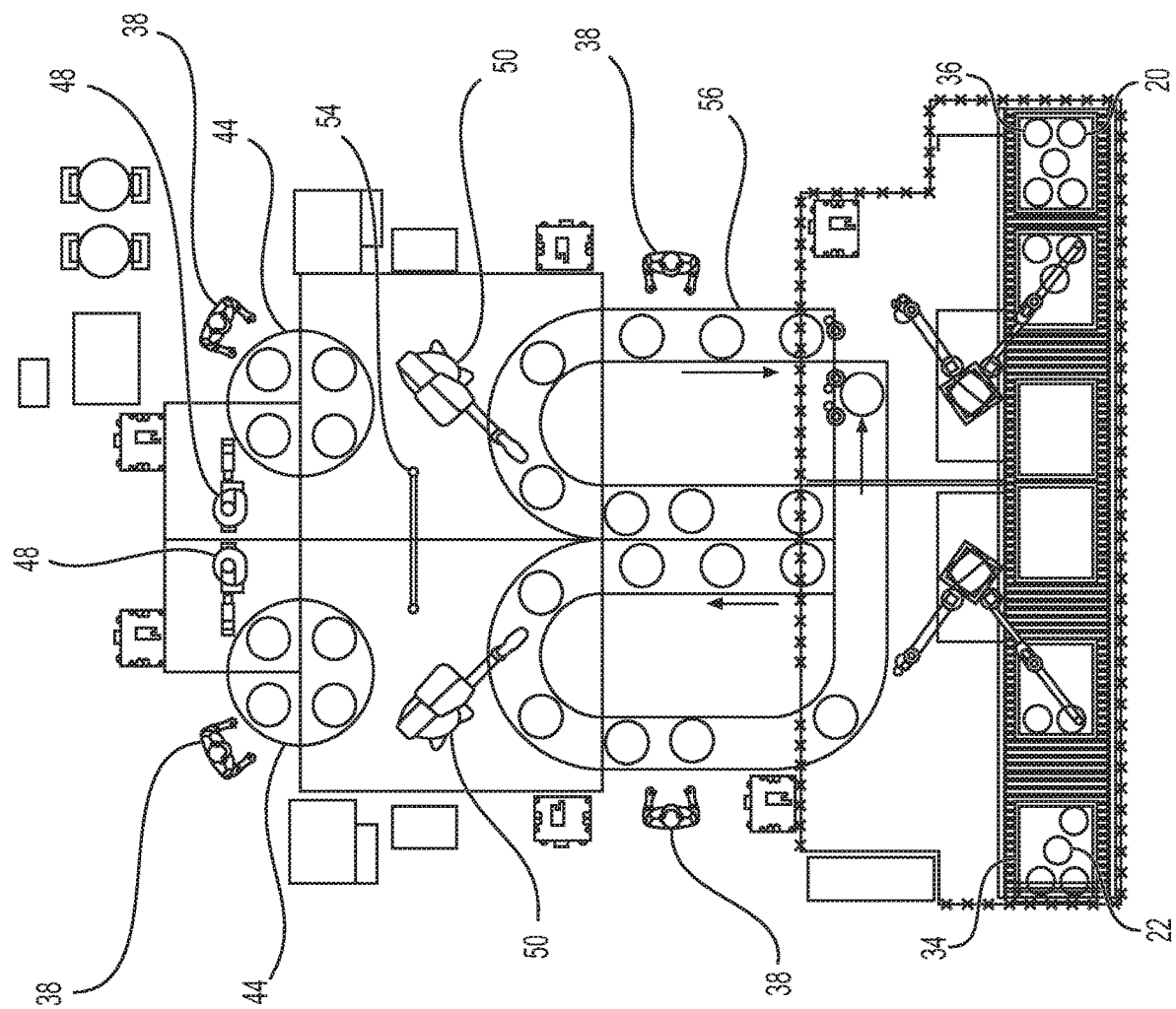
Figure 6:
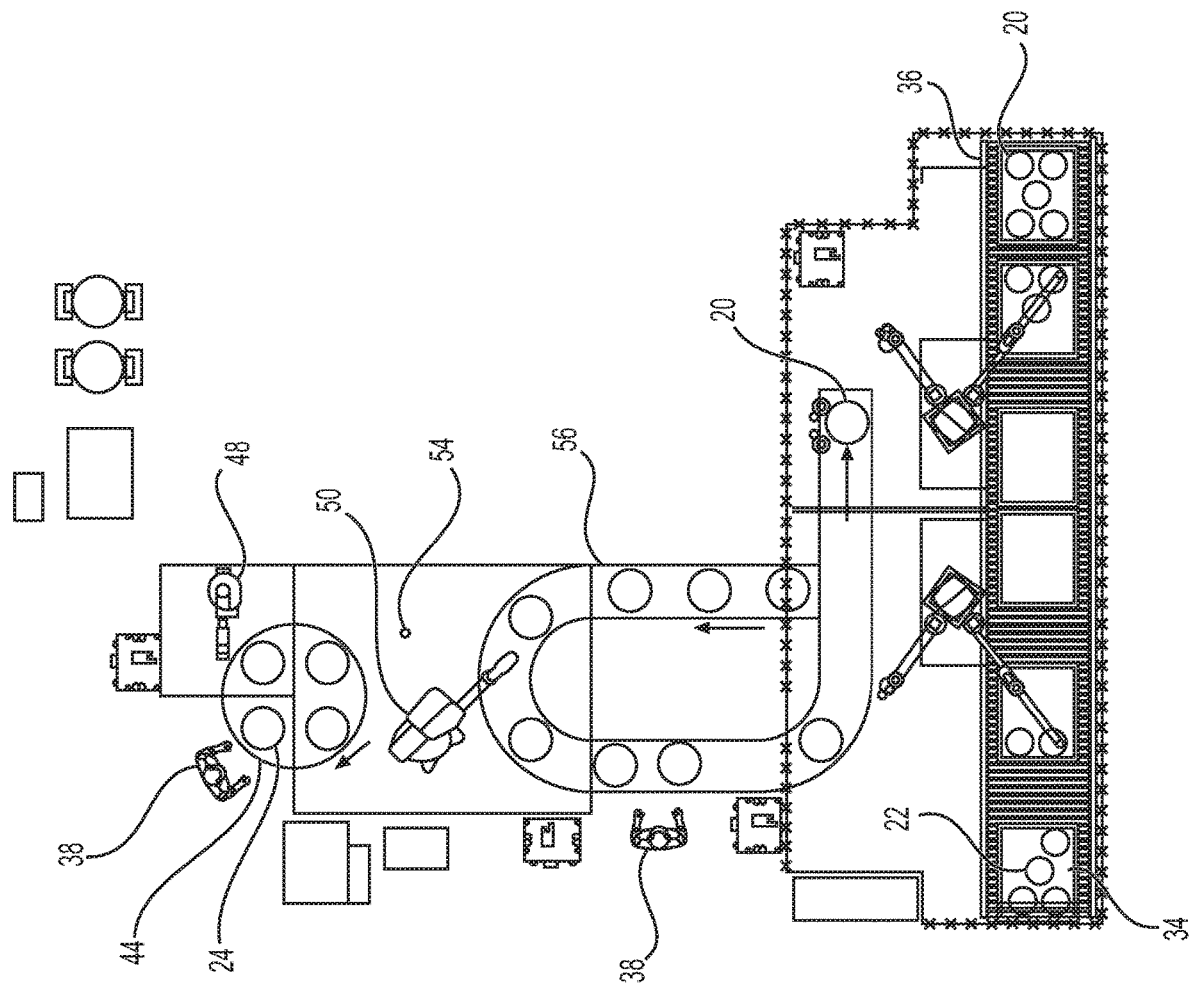
Figure 7:
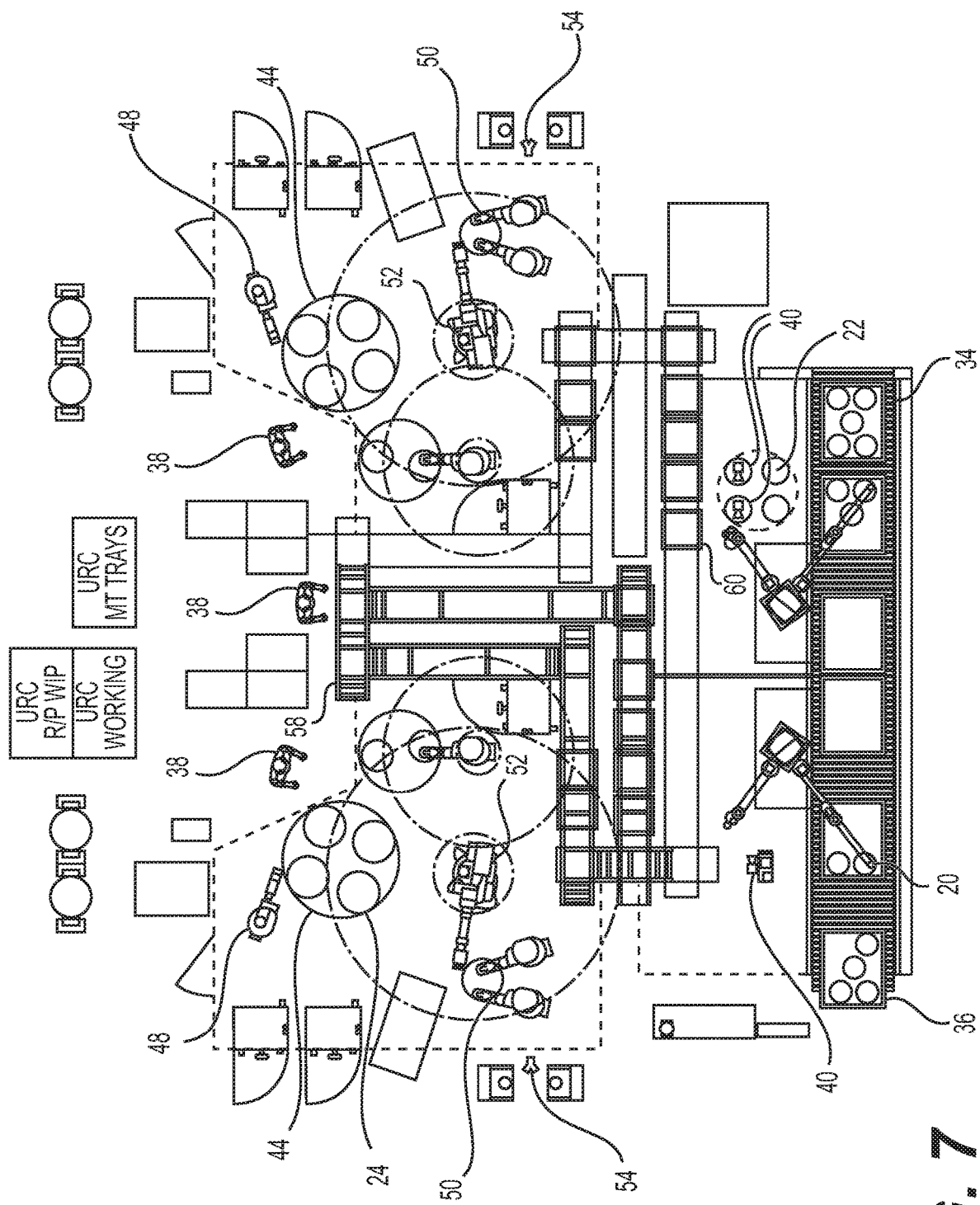
Figure 8:
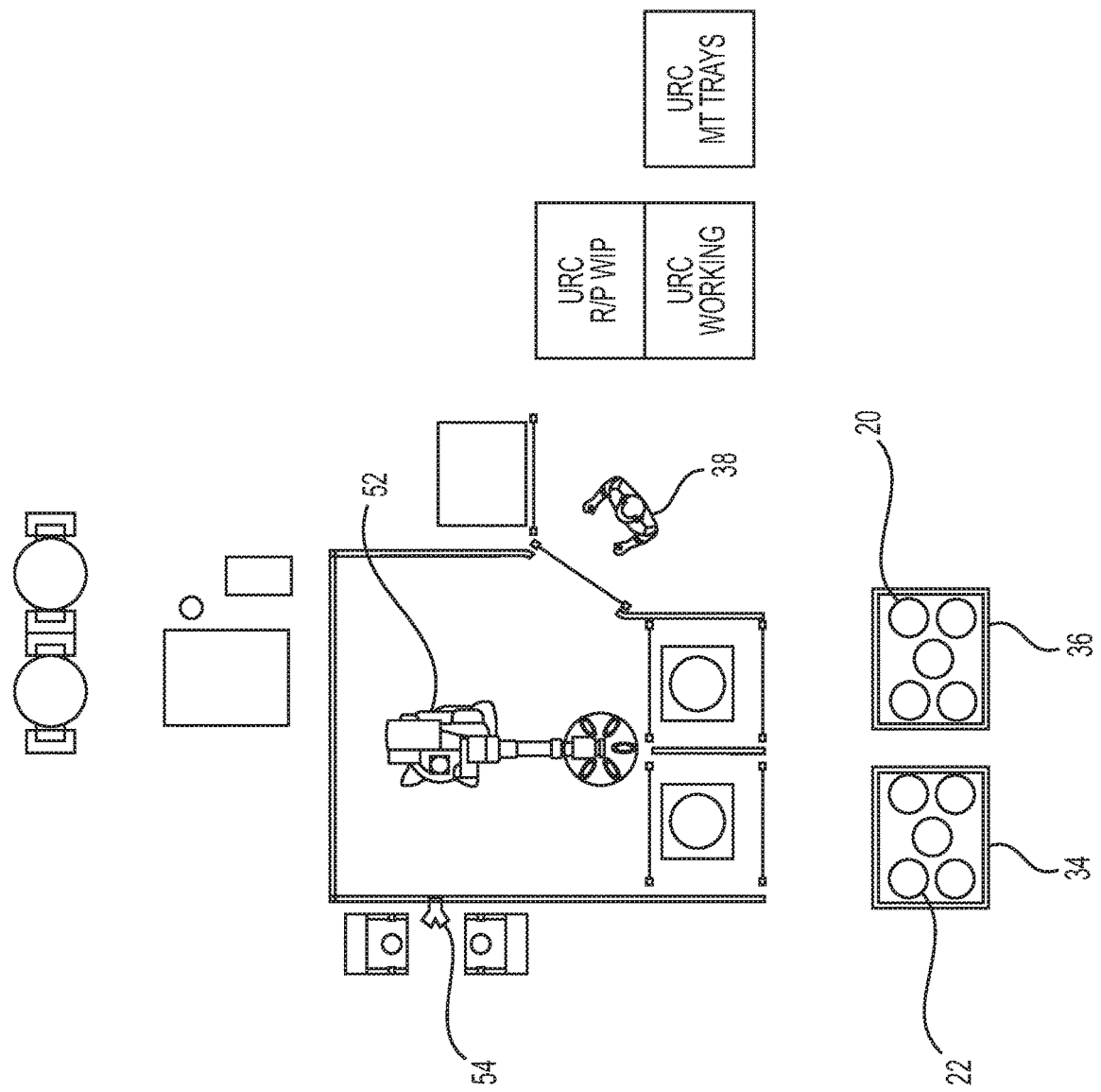
Figure 9:
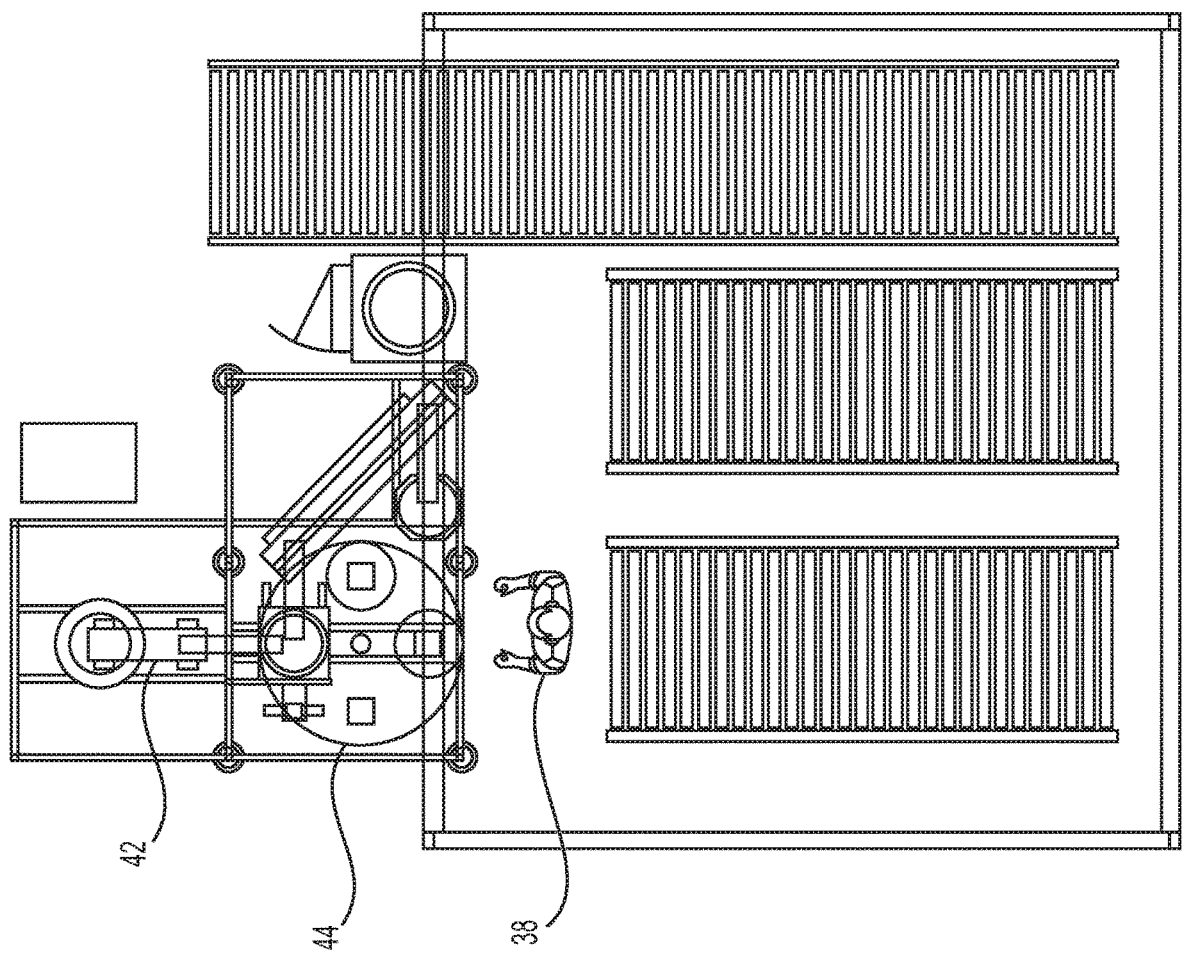
Figure 10:
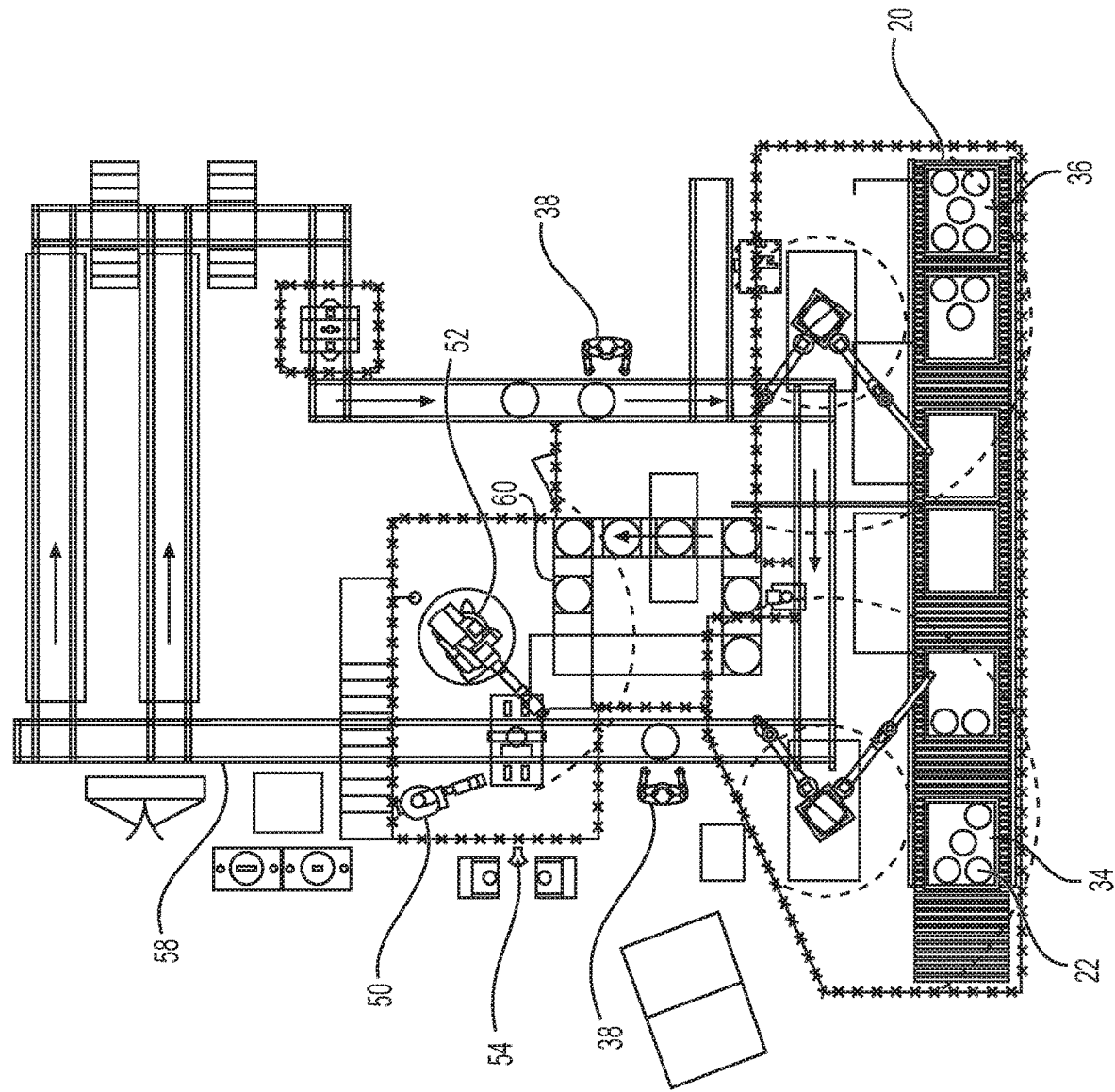

In general, the present disclosure relates to methods of forming a wheel assembly 20 consisting of a wheel portion 22 and at least one cover portion 24. An example wheel assembly 20 according to aspects of the disclosure is shown in FIG. 1. Specifically, the wheel assembly 20 consists of the wheel portion 22 having an outboard face 26 and an inboard face 28 opposite the outboard face 26 and the at least one cover portion 24 having a front side 30 and a back side 32 opposite the front side 30. The methods of forming a wheel assembly 20 of this disclosure will be described in conjunction with one or more example embodiments. Accordingly, example methods and assembly lines may include according to aspects, but are not limited to, those shown in FIGS. 2-10. The specific example embodiments disclosed are merely provided to describe the inventive concepts, features, advantages and objectives with sufficient clarity to permit those skilled in this art to understand and practice the disclosure.

Figure 11:
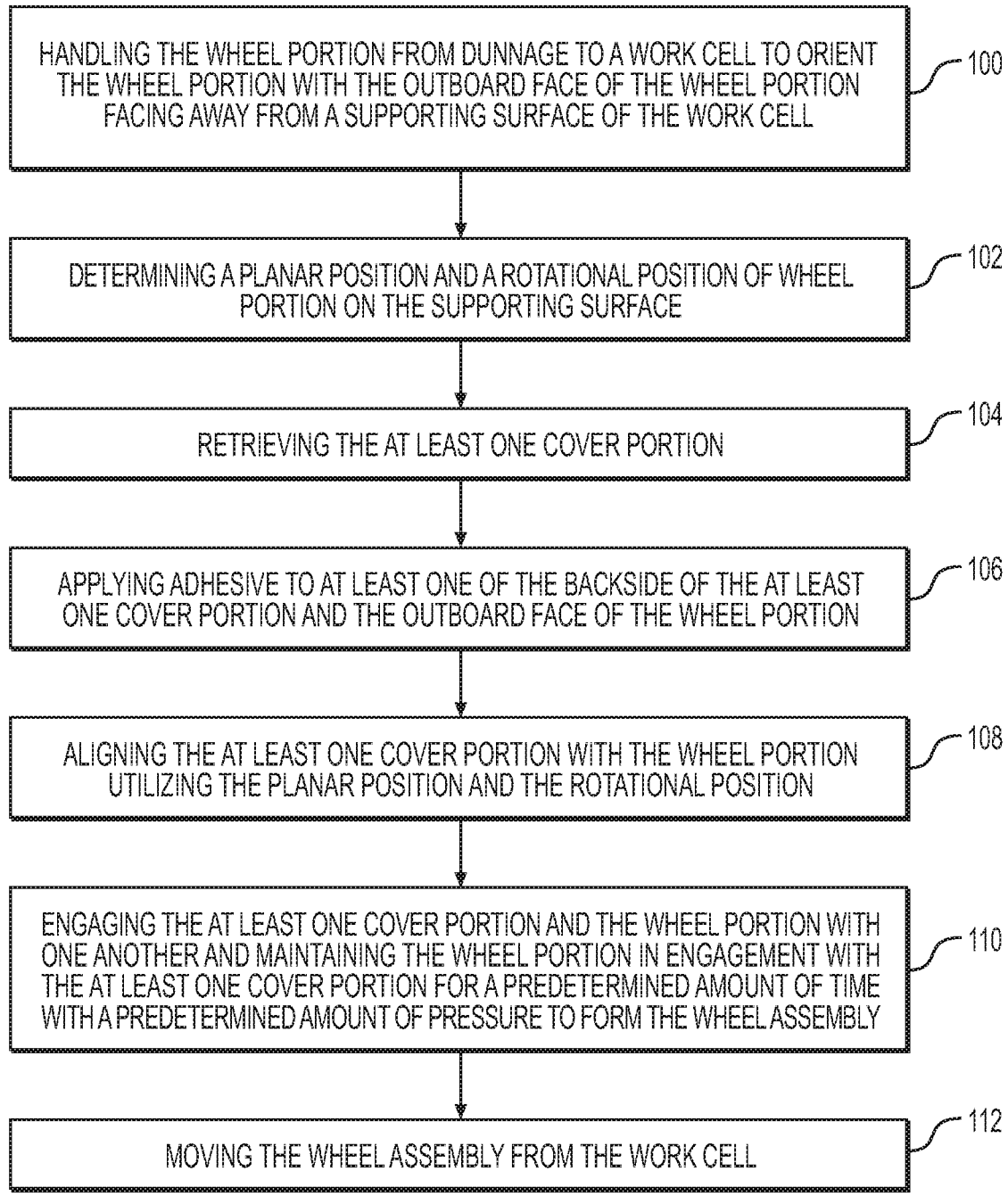
FIG. 11 is a flow chart illustrating steps of a method of forming a wheel assembly according to aspects of the disclosure.

As best shown in FIG. 11, the method of forming the wheel assembly 20 generally may include the step of 100 handling the wheel portion 22 from dunnage 34 to a work cell to orient the wheel portion 22 with the outboard face 26 of the wheel portion 22 facing away from a supporting surface of the work cell. The method can continue with the step of 102 determining a planar position and a rotational position of wheel portion 22 on the supporting surface. Next, 104 retrieving the at least one cover portion 24. The next step of the method can be 106 applying an adhesive to at least one of the back side 32 of the at least one cover portion 24 and the outboard face 26 of the wheel portion 22. The method may also include the step of 108 aligning the at least one cover portion 24 with the wheel portion 22 utilizing the planar position and the rotational position. The method may then proceed with the step of 110 engaging the at least one cover portion 24 and the wheel portion 22 with one another and maintaining the wheel portion 22 in engagement with the at least one cover portion 24 for a predetermined amount of time with a predetermined amount of pressure to form the wheel assembly 20. The method may also include the step of 112 moving the wheel assembly 20 from the work cell (e.g., to finished dunnage 36).

Figure 12:
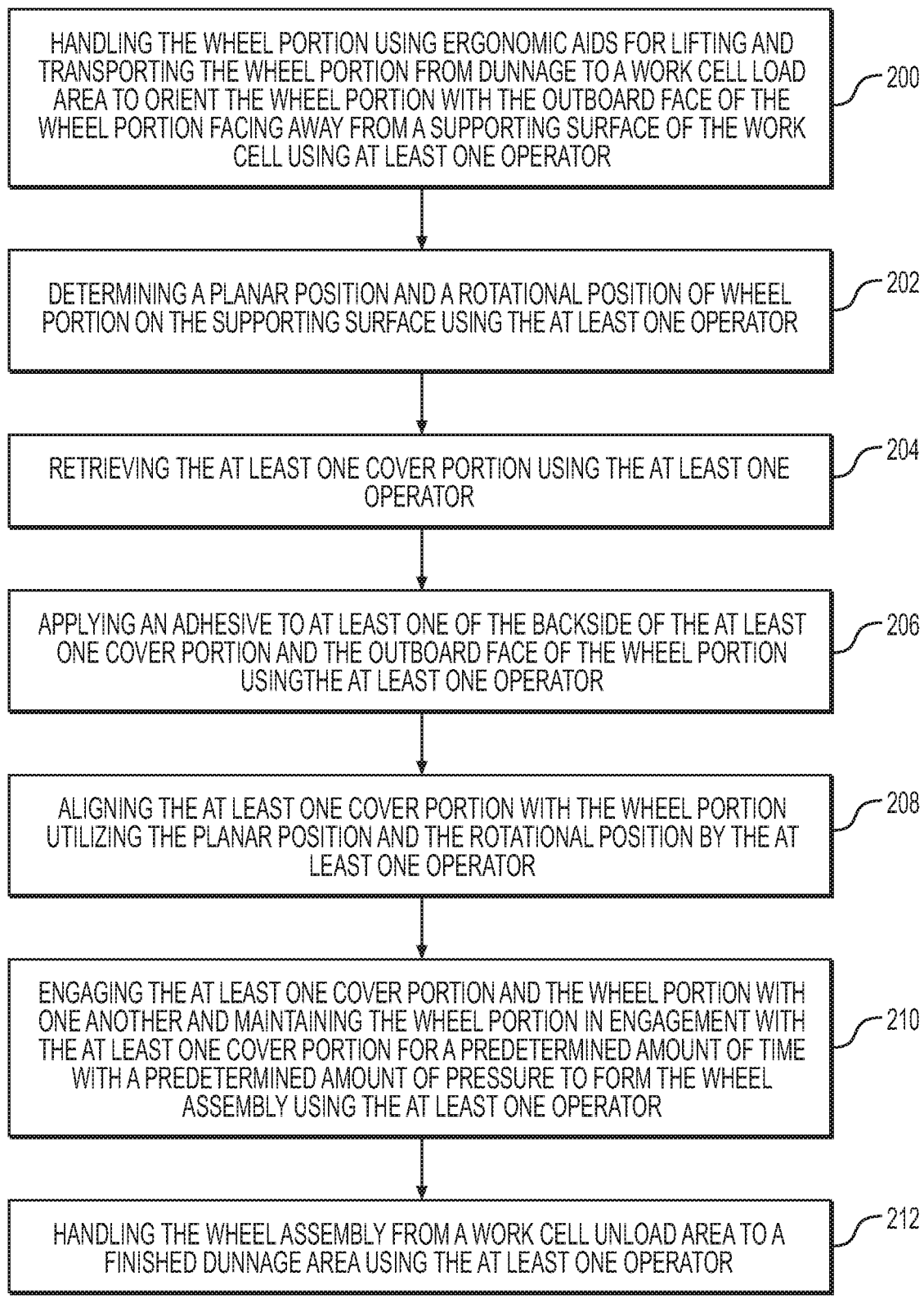
FIG. 12 is a flow chart illustrating steps of an exemplary first method of forming a wheel assembly according to aspects of the disclosure.

In FIG. 12, an exemplary first method according to aspects of the disclosure is shown and can begin with the step of providing a work table. Thus, the supporting surface could be a surface of the work table. The method can proceed by handling the wheel portion 22 by an operator 38. In more detail, the step of 100 handling the wheel portion 22 from dunnage 34 to a work cell to orient the wheel portion 22 with the outboard face 26 of the wheel portion 22 facing away from a supporting surface of the work cell can include the step of 200 handling the wheel portion 22 using ergonomic aids for lifting and transporting the wheel portion 22 from the dunnage 34 to the work cell load area with the outboard face 26 of the wheel portion 22 facing away from the supporting surface of the work cell using at least one operator 38. In other words, the at least one operator 38 can utilize or may omit the use of varying degrees of ergonomic aids for lifting and transporting the wheel portion 22 from dunnage 34 to the work cell load area while handling the wheel portion 22. The at least one operator 38 may also utilize ergonomic aids while handling the finished wheel assembly 20 from a work cell unload area to finished dunnage 36. There may also be intervention of the at least one operator 38 to deal with lids of dunnage 34 and protective foam sheets. This can depend on the setting in which the method is being carried out. For example, if the method is carried out at a wheel company and the wheel portions 22 were coming down a line, there would be no dunnage 34 at that point to manage on unload, but may need to be managed for loading of the finished goods (e.g. the completed wheel assembly 20).

In the first method, the step of 102 determining the planar position and the rotational position of wheel portion 22 on the supporting surface includes the step of 202 acquiring the planar position and the rotational position of the wheel portion 22 on the supporting surface using the at least one operator 38. In other words, the at least one operator 38 determines the orientation of the wheel portion 22. It should be appreciated that other aids may be used in positioning the wheel portion 22, such as utilizing a jig to ensure the alignment and rotational position of the wheel portion 22. Likewise, the first method implements the step of 104 retrieving the at least one cover portion 24 as 204 retrieving the at least one cover portion 24 using the at least one operator 38.

The first method continues with the step of applying an adhesive to the at least one cover portion 24, so that it may be attached to the wheel portion 22. Thus, the step of 106 applying an adhesive to at least one of the back side 32 of the at least one cover portion 24 and the outboard face 26 of the wheel portion 22 can be implemented in the first method as the step of 206 applying an adhesive to at least one of the back side 32 of the at least one cover portion 24 and the outboard face 26 of the wheel portion 22 using the at least one operator 38. Alternatively, the adhesive may be applied by the operator 38 to a face of the wheel portion 22. It should also be appreciated that more than one adhesive can be used, one with quick bonding characteristics for fixturing and one with slower cure properties for permanent bonding.

The adhesives used herein can include, but are not limited to, a single component silicone adhesive RTV (room temperature vulcanizing) (solid or foamed), dual component silicone RTV adhesive, silicone or urethane based hot melts, for example. The inventors have found that a dispensed amount of 'reactive urethane hot melt' of a certain durometer and viscosity is optimized for initial 'fixing' of the at least one cover portion 24 to the wheel portion 22, while the 'silicone' based/moisture cure RTV adhesive provides further long term attachment. The 'silicone' based adhesive is a less expensive adhesive and has a longer 'open time' before 'skin-over' (skin-over defined as: a curing of the outside skin of the dispensed bead which is detrimental to the 'bond' of the adhesive to the intended substrate), than does the hot melt. The dispensed hot melt does not have as much 'open-time' as does the silicone based adhesive. The reactive hot melt experiences long term curing using available moisture in the air such that this particular hot melt will not 're-melt' with brake induced heat, which is important when using such an adhesive in proximity of automotive brakes.

In the first method, the step of 108 aligning the at least one cover portion 24 with the wheel portion 22 utilizing the planar position and the rotational position can include 208 aligning the at least one cover portion 24 with the wheel portion 22 utilizing the planar position and the rotational position by the at least one operator 38. Then, the step of 110 engaging the at least one cover portion 24 and the wheel portion 22 with one another and maintaining the wheel portion 22 in engagement with the at least one cover portion 24 for the predetermined amount of time with the predetermined amount of pressure to form the wheel assembly 20 can include the step of 210 engaging the at least one cover portion 24 and the wheel portion 22 with one another and maintaining the wheel portion 22 in engagement with the at least one cover portion 24 for a predetermined amount of time with a predetermined amount of pressure to form the wheel assembly 20 using the at least one operator 38. Therefore, the first method does not require nesting (i.e., materials used to support the wheel portion 22 or the at least one cover portion 24).

The first method also carries out the step of 112 moving the wheel assembly 20 from the work cell with the at least one operator 38. Thus, the first method includes the step of 212 handling the wheel assembly 20 from a work cell unload area to a finished dunnage 36 area using the at least one operator 38. As mentioned above, ergonomic aids may be utilized by the at least one operator 38 to move the wheel assembly 20.

Figure 13:
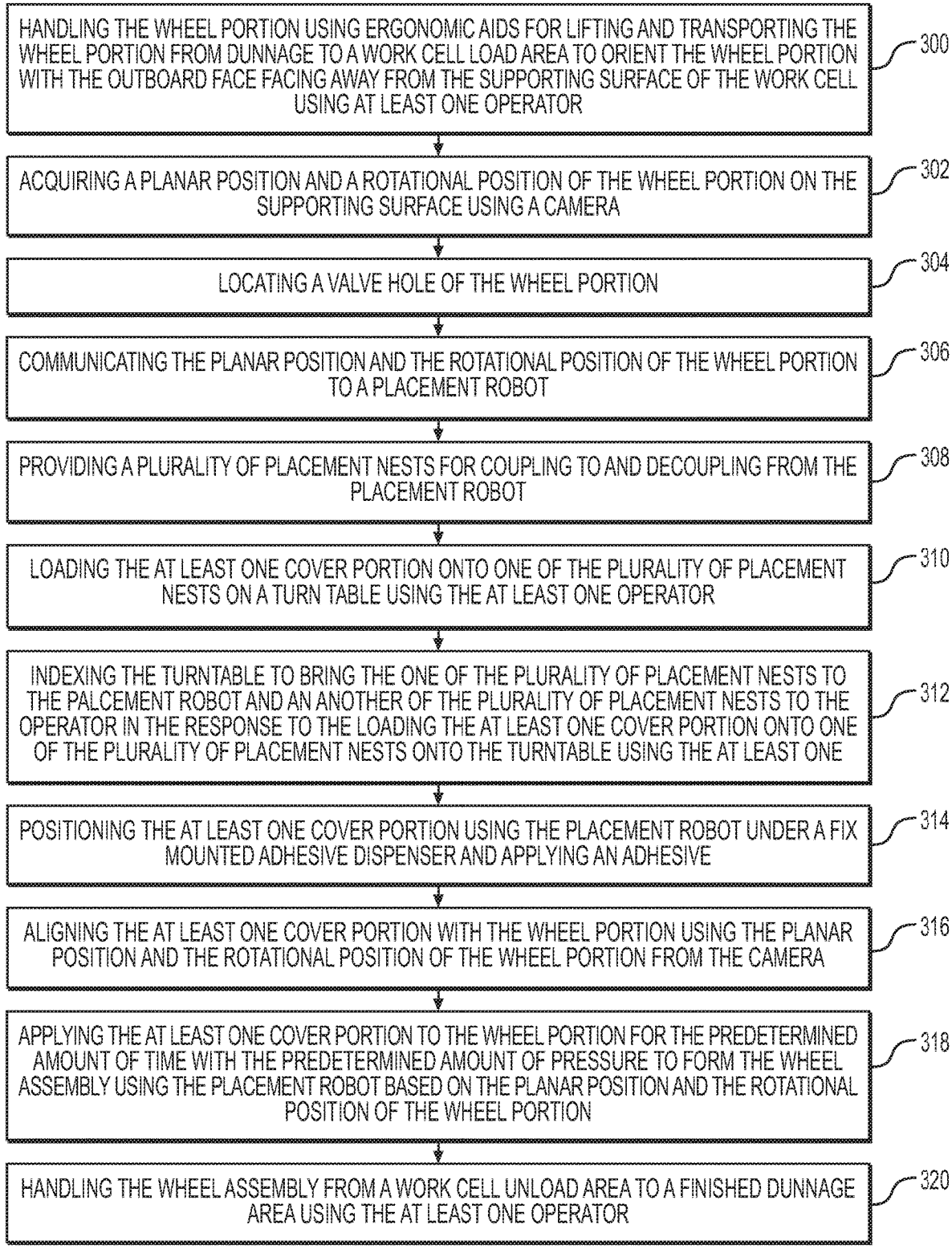
FIG. 13 is a flow chart illustrating steps of an exemplary second method of forming a wheel assembly according to aspects of the disclosure.

An exemplary second method according to aspects of the disclosure is also disclosed. The second method can begin by providing a single point load and unload for a plurality of the wheel portions 22. As best shown in FIG. 13, the step of 100 handling the wheel portion 22 from dunnage 34 to a work cell to orient the wheel portion 22 with the outboard face 26 of the wheel portion 22 facing away from a supporting surface of the work cell can include the step of 300 handling the wheel portion 22 using ergonomic aids for lifting and transporting the wheel portion 22 from the dunnage 34 to the work cell load area with the outboard face 26 of the wheel portion 22 facing away from the supporting surface of the work cell using at least one operator 38. Nevertheless, as in the first method, the handling the wheel by the operator 38 can include or may omit using varying degrees of ergonomic aids for lifting and transporting the wheel portion 22 from dunnage 34 to the work cell load area and from the work cell unload area to finished dunnage 36. As discussed above for the first method, there may be human/operator 38 intervention to deal with lids of dunnage 34 and protective foam sheets depending on the setting in which the method is being carried out.

In the second method, the step of 102 determining a planar position and a rotational position of wheel portion 22 on the supporting surface includes the steps of 302 acquiring the planar position and the rotational position of the wheel portion 22 on the supporting surface using a camera 40 and 304 locating a valve hole of the wheel portion 22. So, the wheel portion 22 may be placed by the at least one operator 38 in the one and only known location (wheel portion 22 position is adjustable rotationally by operator 38) which is underneath a camera 40. The camera 40 software acquires the planar location (X & Y) and rotational position and communicates this to the placement robot 42. The second method can also include the step of 306 communicating the planar position and the rotational position of the wheel portion 22 to a placement robot 42 (e.g., see FIG. 9). The wheel portion 22 does not move until the at least one cover portion 24 has been located onto the wheel portion 22 (discussed below).

The second method can implement the step of 104 retrieving the at least one cover portion 24 with the step of placing the at least one cover portion 24 upside down in one of a plurality of nests adapted to couple with the placement robot 42. More specifically, the second method can include the step of 308 providing a plurality of placement nests for coupling to and decoupling from the placement robot 42. Next, 310 loading the at least one cover portion 24 onto one of the plurality of placement nests on a turntable 44 (FIG. 9) using the at least one operator 38. The second method can then proceed with the step of 312 indexing the turntable 44 to bring the one of the plurality of placement nests to the placement robot 42 and an another of the plurality of placement nests to the operator 38 in response to the loading the at least one cover portion 24 onto one of the plurality of placement nests onto the turntable 44 using the at least one operator 38. So, using a two position indexer or turntable 44, the operator 38 loads the at least one cover portion 24 onto the placement nest, the turntable 44 'indexes/rotates' which brings an empty nest to the operator 38, and a populated nest to the placement robot 42.

The second method can carry out the step of 106 applying an adhesive to at least one of the back side 32 of the at least one cover portion 24 and the outboard face 26 of the wheel portion 22 by 314 positioning the at least one cover portion 24 using the placement robot 42 under a fix mounted adhesive dispenser 46 (FIGS. 7, 8, 10) and applying an adhesive. Simultaneously with the step of 314 positioning the at least one cover portion 24 using the placement robot 42 under a fix mounted adhesive dispenser 46, the method includes the step of placing the at least one cover portion 24 onto the wheel portion 22 using camera software guidance with the placement robot 42 (i.e., to direct the placement robot 42 for X & Y and rotational orientation). In other words, all process steps of the second method are sequential, except for the wheel image by camera 40 & software/placement solution, which can be concurrent with the adhesive dispense. So, the step of 108 aligning the at least one cover portion 24 with the wheel portion 22 utilizing the planar position and the rotational position in the second method can include the step of 316 aligning the at least one cover portion 24 with the wheel portion 22 using the planar position and the rotational position of the wheel portion 22 from the camera 40. It should be appreciated that the adhesive could instead be applied in an appropriate localized pattern(s) using another robot. In addition, a camera 40 inspection may be carried out to ensure the at least one cover portion 24 is on the placement nest before applying adhesive.

The use of the placement nest of the second method can use a single position location, for one custom nest which accommodates the at least one cover portion 24. The custom nest may not stay connected to the placement robot 42 during loading of the at least one cover portion 24 by the at least one operator 38, during adhesive application to back side 32 of at least one cover portion 24, during placement of the at least one cover portion 24 onto a 'face-up' wheel portion 22 (i.e., the outboard face 26 of the wheel portion 22), during appropriate pressure and dwell time of the at least one cover portion 24 to allow the temporary bonding adhesive to develop adequate 'tack and green strength'. As used herein, tack and green strength is the development of bond strength which is adequate enough to adhere the at least one cover portion 24 to the wheel portion 22, but not so strong that it cannot be disassembled, should quality inspection by the at least one operator 38 or the camera 40 so demand.

Then, the step of 110 engaging the at least one cover portion 24 and the wheel portion 22 with one another and maintaining the wheel portion 22 in engagement with the at least one cover portion 24 for the predetermined amount of time with the predetermined amount of pressure to form the wheel assembly 20 includes the step of 318 applying the at least one cover portion 24 to the wheel portion 22 for the predetermined amount of time with the predetermined amount of pressure using the placement robot 42 based on the planar position and the rotational position of the wheel portion 22. After the placement robot 42 couples with the placement nest and applies the at least one cover portion 24 to the face up wheel portion 22 for an appropriate dwell time and pressure, the nest placement robot 42 lifts the empty placement nest straight up and away and the placement robot 42 returns the empty nest to the indexer or turntable 44 and decouples from the nest. This part of the process can then repeat. The second method may also include the step of 320 handling the wheel assembly 20 from the work cell unload area to the finished dunnage 36 area using the at least one operator 38.

While the adhesive may be applied by the fix mounted adhesive dispenser 46 to the at least one cover portion 24 in the second method, it should be appreciated that the adhesive can instead be applied to the face up wheel portion 22 (i.e., the wheel portion 22 is positioned by the at least one operator 38 on a nest that locates the wheel portion 22 planar position and with the aid of a camera 40, the human rotates the wheel clockwise or counter clockwise until rotational location is satisfied). As above, two placement nests may be used that are intended to couple and decouple from the placement robot 42. Using a two position indexer or turntable 44, the operator 38 loads the at least one cover portion 24 onto a placement nest, the indexer 'indexes/rotates' which brings an empty nest to the operator 38, and a populated nest to the placement robot 42. Another robot could place the at least one cover portion 24 onto the wheel portion 22 for an adequate dwell time and pressure.

Figure 14A:
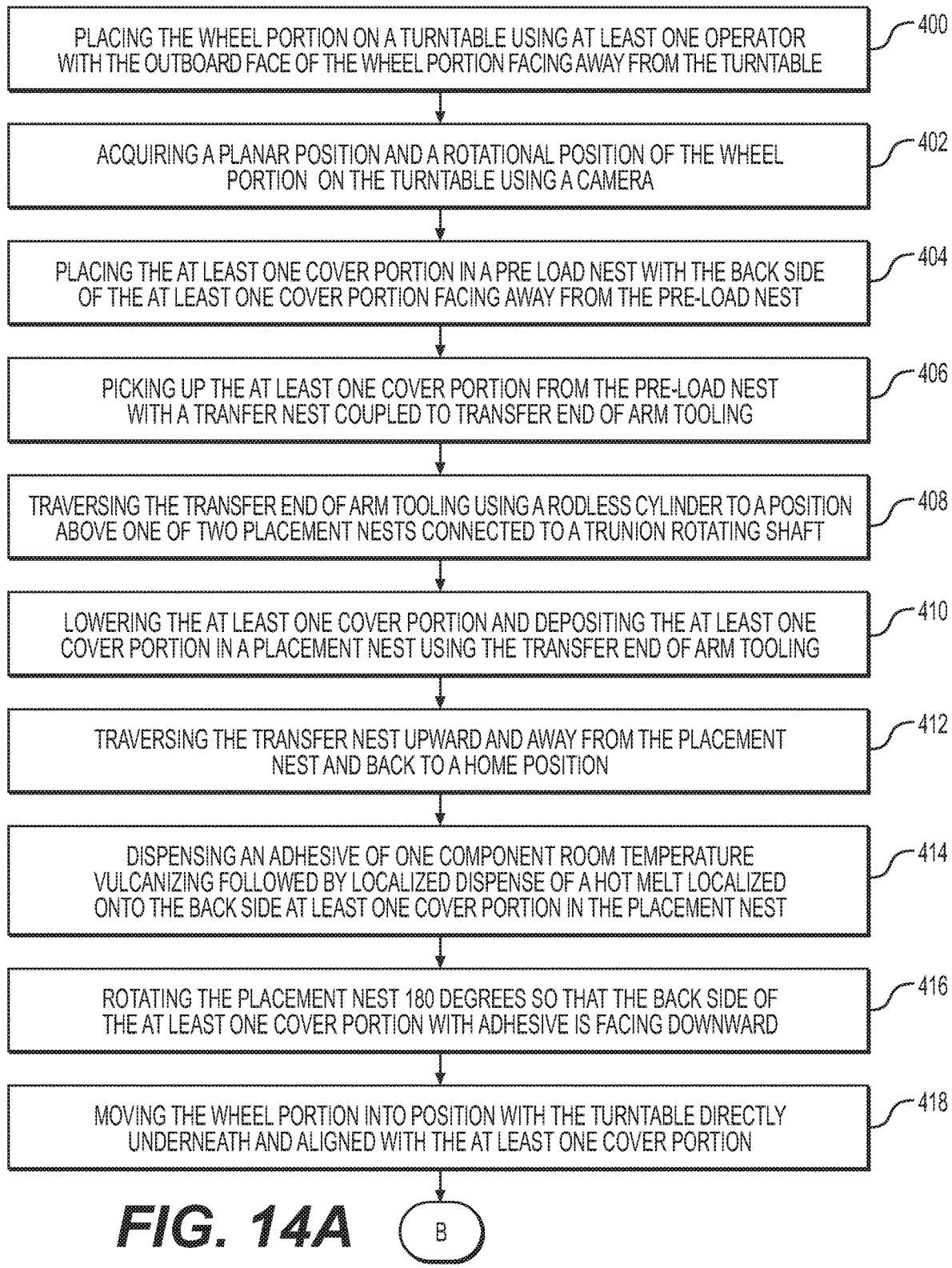
FIG. 14A-14B are flow charts illustrating steps of an exemplary third method of forming a wheel assembly according to aspects of the disclosure.
Figure 14B:
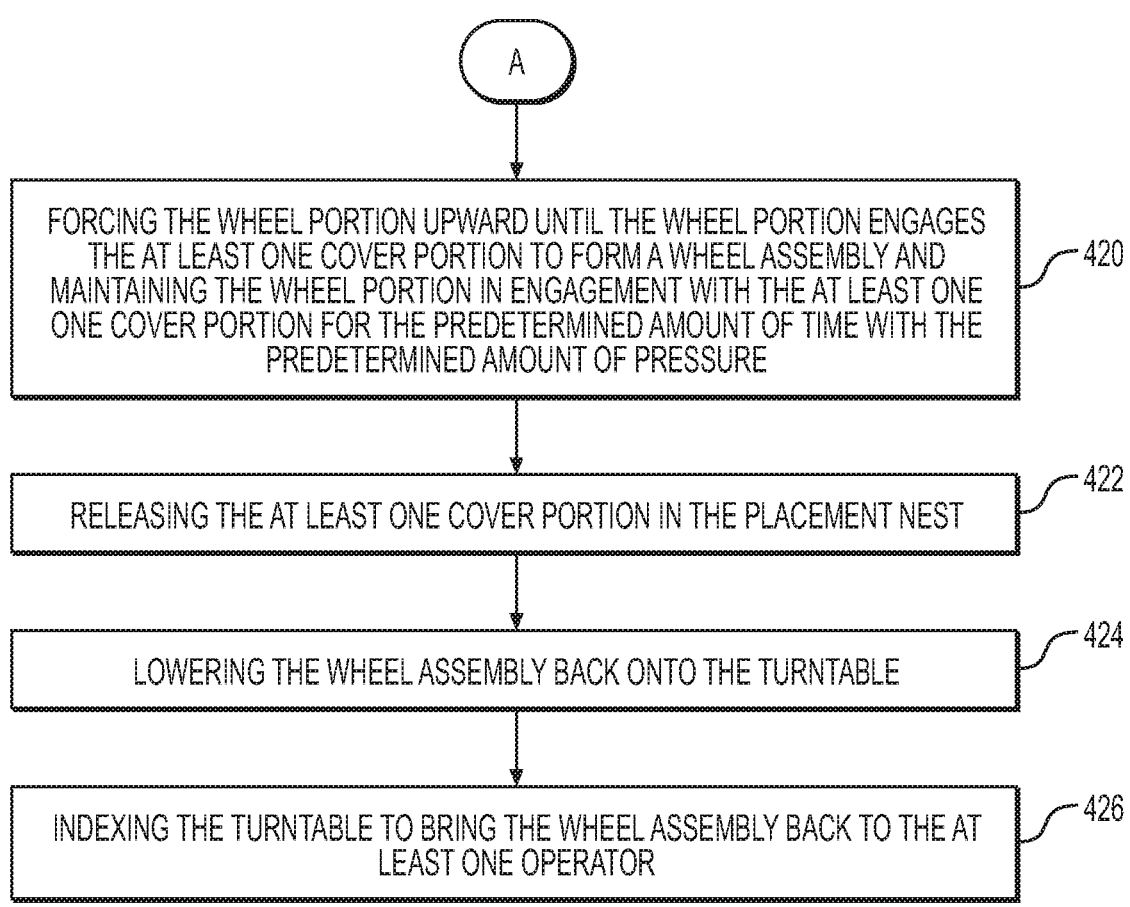

An exemplary third method according to aspects of the disclosure is also disclosed. The third method begins by providing a single point load and unload of a plurality of wheel portions 22. As best shown in FIGS. 14A-14B, the third method implements the step of 100 handling the wheel portion 22 from dunnage 34 to a work cell to orient the wheel portion 22 with the outboard face 26 of the wheel portion 22 facing away from a supporting surface of the work cell with the step of 400 placing the wheel portion 22 on a turntable 44 using at least one operator 38 with the outboard face 26 of the wheel portion 22 facing away from the turntable 44. The turntable 44 can be, for example, a two or four station turntable 44. As with the above described methods, the step of handling the wheel by the operator 38 can include or may omit using varying degrees of ergonomic aids for lifting and transporting the wheel portion 22 from dunnage 34 to a work cell load area and from a work cell unload area to finished dunnage 36.

In the third method, the step of 102 determining a planar position and a rotational position of wheel portion 22 on the supporting surface can include 402 acquiring the planar position and the rotational position of the wheel portion 22 on the turntable 44 using a camera 40. So, the X & Y position (i.e., planar position) of the wheel portion 22 with a nest can be determined and the at least one operator 38 can control the rotational position or orientation of the wheel portion 22 with aid of the camera 40 monitoring the valve hole (or other discerning wheel feature), for example.

The step of 104 retrieving the at least one cover portion 24 in the third method can include the steps of 404 placing the at least one cover portion 24 in a pre-load nest with the back side 32 of the at least one cover portion 24 facing away from the pre-load nest (i.e., the at least one cover portion 24 oriented upside down) and 406 picking up the at least one cover portion 24 from the pre-load nest with a transfer nest coupled to transfer end of arm tooling 52 (EOAT) (FIGS. 7, 8, and 10), using vacuum suction cups, for example. Next, 408 traversing the transfer end of arm tooling 52 using a rodless cylinder to a position above one of two placement nests connected to a trunion rotating shaft. The third method can then proceed by 410 lowering the at least one cover portion 24 and depositing the at least one cover portion 24 in a placement nest using the transfer end of arm tooling 52. The third method can also include the step of 412 traversing the transfer nest upward and away from the placement nest and back to a home position. So, the at least one cover portion 24 is moved from the 'pre-load' nest with a transfer end of arm tooling 52 and traversing the transfer EOAT 52 using a rodless cylinder to a position above one of two identical 'placement nests' (which are connected to a trunion rotating shaft). The at least one cover portion 24 can be lowered and deposited in a placement nest using the EOAT 52 (the placement nest is configured to receive the at least one cover portion 24 upside down and holds them in position using vacuum).

The step of 106 applying an adhesive to at least one of the back side 32 of the at least one cover portion 24 and the outboard face 26 of the wheel portion 22 in the third method can include the step of 414 dispensing an adhesive of one component room temperature vulcanizing followed by localized dispense of a hot melt localized onto the at least one cover portion 24 in the placement nest. Next, 416 rotating the placement nest 180 degrees so that the back side 32 of the at least one cover portion 24 with adhesive is facing downward. So, after dispensing an adhesive of one component RTV, followed by localized dispense of a hot melt localized onto the at least one cover portion 24 in the placement nest (e.g., using one or more hot melt dispense nozzles 54), the placement nest can be rotated 180 degrees (trunion bearing shaft) so that the at least one cover portion 24 with adhesive is facing downward. While this is occurring, the wheel portion 22 may be moved into position with the turntable 44 directly underneath and aligned with the orientation of the at least one cover portion 24.

Then, the step of 110 engaging the at least one cover portion 24 and the wheel portion 22 with one another and maintaining the wheel portion 22 in engagement with the at least one cover portion 24 for a predetermined amount of time with a predetermined amount of pressure to form the wheel assembly 20 can include the steps of 418 moving the wheel portion 22 into position with a turntable 44 directly underneath and aligned with the at least one cover portion 24 and 420 forcing the wheel portion 22 upward until the wheel portion 22 engages the at least one cover portion 24 to form a wheel assembly 20 and maintaining the wheel portion 22 in engagement with the at least one cover portion 24 for the predetermined amount of time with the predetermined amount of pressure (i.e., to facilitate the development of tack and green strength of the hot melt adhesive). The third method can also include the steps of 422 releasing the at least one cover portion 24 in the placement nest and 424 lowering the wheel assembly 20 back onto the turntable 44. The third method may also include the step of 426 indexing the turntable 44 to bring the wheel assembly 20 back to the at least one operator 38. For example, the suction of the at least one cover portion 24 in the placement nest can be relieved prior to the wheel assembly 20 being lowered back onto the turntable 44. Next, indexing the turntable 44 to bring the wheel assembly 20 back to the at least one operator 38. Thus, a pre-load nest is used for the at least one cover portion 24 and one transfer EOAT nest connected to a rodless traversing cylinder may also be used. Two placement nests connected to a rotating trunion can also be utilized, so each can alternatively face upward or downward. Inspection using the camera 40 can also be utilized to ensure all cover portions 24 are placed into the transfer nest.

It should be appreciated that some steps may be carried out concurrently. Specifically, when the wheel portion 22 is in upward position receiving the at least one cover portion 24 with adhesive, the next at least one cover portion 24 has been deposited in the second and identical placement nesting and the adhesive is applied. When the transfer EOAT 52 is moving toward or depositing the at least one cover portion 24 onto a placement nest, the operator 38 is loading the pre-load nest with another at least one cover portion 24 and/or removing a wheel assembly 20 and replacing with a wheel portion 22 to be assembled.

Additionally, the adhesive can alternatively be applied to the face up wheel portion 22. In more detail, the wheel portion 22 is positioned by the operator 38 on nesting that locates wheel planar position and with the aid of a camera 40 the operator 38 rotates the wheel portion 22 clockwise or counter clockwise until rotational location is satisfied. Next, the turntable 44 indexes. The adhesive is applied robotically to the wheel portion 22. The turntable 44 indexes. The wheel portion 22 is raised off the table to interface with the at least one cover portion 24 for an appropriate dwell time and pressure.

Figure 15A:
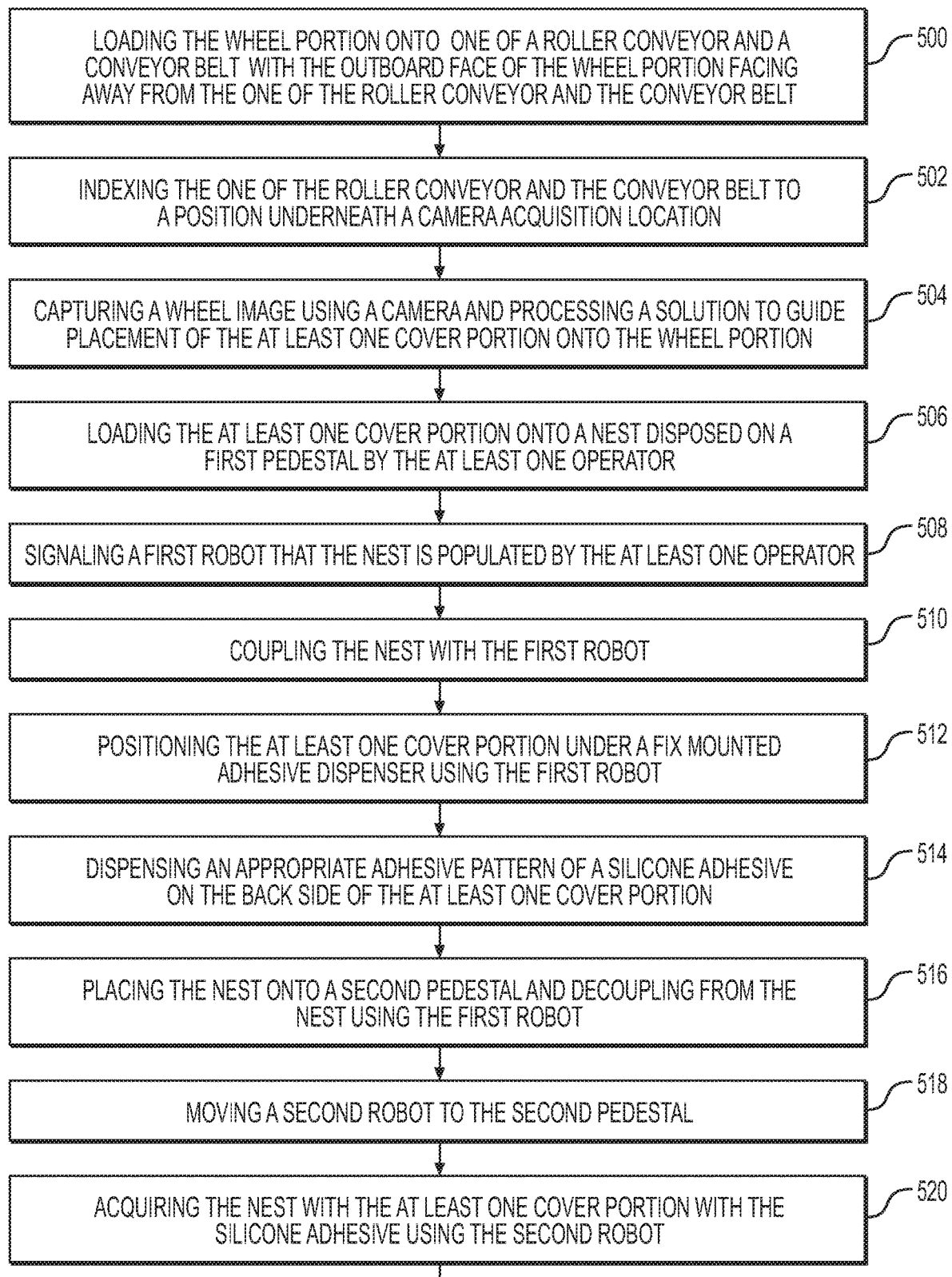
FIGS. 15A-15B and 16A-16B are flow charts illustrating steps of an exemplary fourth method of forming a wheel assembly according to aspects of the disclosure.
Figure 15B:
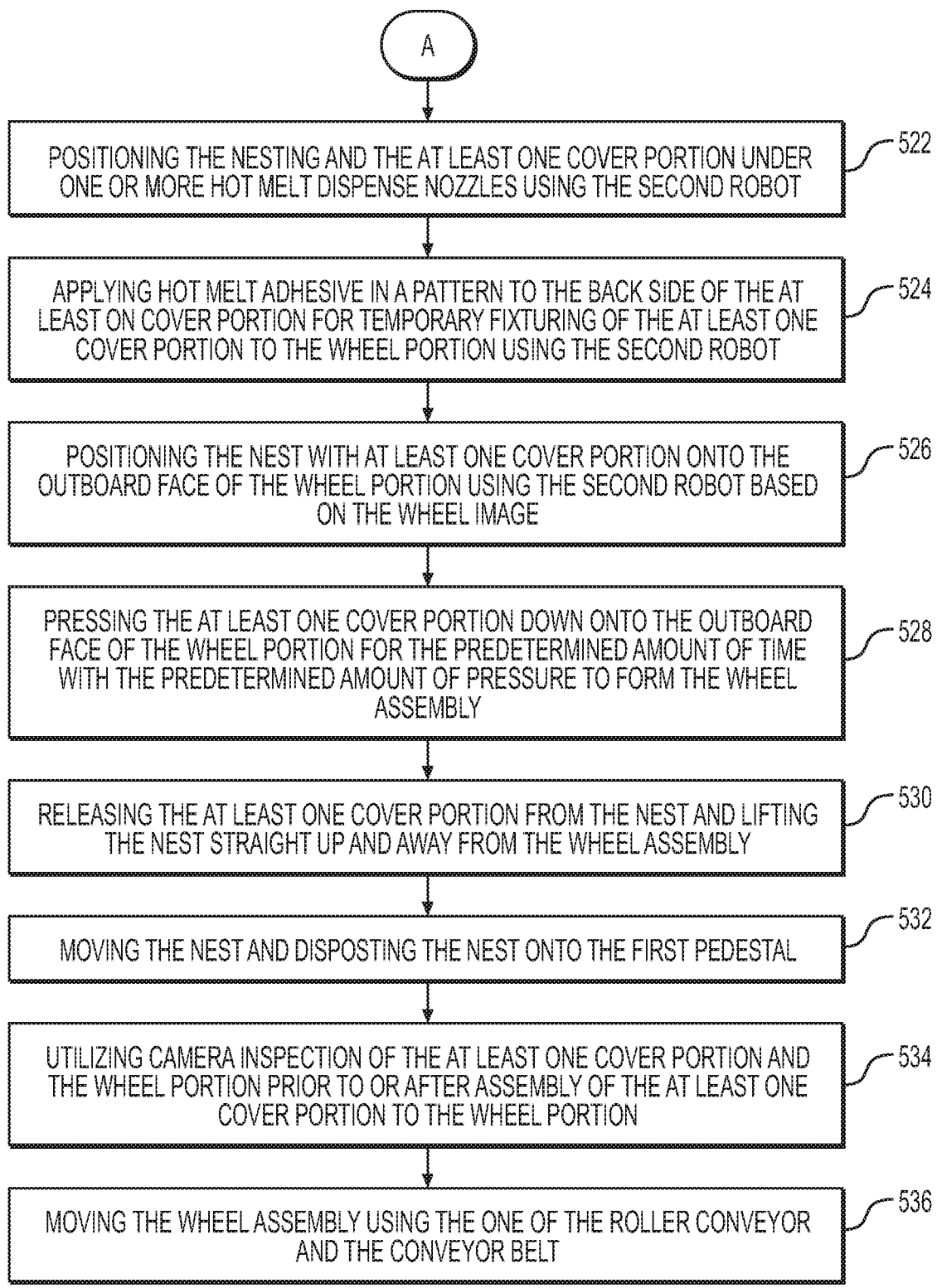

An exemplary fourth method according to aspects of the disclosure is also disclosed. The fourth method begins by providing an indexing conveyor belt and/or roller conveyor 56. The indexing conveyor belt and/or roller conveyor 56 (FIGS. 3, 5, and 6) may include multiple corners versus a straight line conveyor 56. Therefore, assembly steps can be occurring concurrently with multiple robots 42, 48, 50 and the at least one operator 38. As best shown in FIGS. 15A-15B, the step of 100 handling the wheel portion 22 from dunnage 34 to a work cell to orient the wheel portion 22 with the outboard face 26 of the wheel portion 22 facing away from a supporting surface of the work cell can include the step of 500 loading the wheel portion 22 onto one of a roller conveyor 56 and a conveyor 56 belt with the outboard face 26 of the wheel portion 22 facing away from the one of the roller conveyor 56 and the conveyor 56 belt (e.g., using the at least one operator 38). As with the above described methods, the handling of the wheel portion 22 and/or wheel assembly 20 by the at least one operator 38 can include or may omit using varying degrees of ergonomic aids for lifting and transporting the wheel portion 22 from dunnage 34 to a work cell load area and from a work cell unload area to finished dunnage 36.

Although the wheel portion 22 may be handled by the at least one operator 38, the step of handling the wheel portion 22 may instead be carried out with camera guided robotics and/or stacking algorithms (FIGS. 4-7 and 10) to robotically remove the wheel portions 22 from the dunnage 34 and place finished wheel assemblies 20 onto finished dunnage 36. There may be human intervention to manage dunnage 34 lids and protective foam sheets. Alternatively, camera 40 guided robotics and/or stacking algorithms can be used to robotically remove the wheel portions 22 from the dunnage 34 and place finished wheel assemblies 20 onto finished dunnage 36. As foam sheets can be temporarily affixed to at least one of four sides of the lids of the dunnage 34 to accommodate robotic moving and placement of the lids with foam sheet affixed, there may be no human intervention necessary in managing lids of the dunnage 34 and protective foam sheets. The temporary fixing devices that secure the foam sheets to the lids of the dunnage 34 can be removed before shipment of finished goods to the customer.

In the fourth method, the step of 102 determining a planar position and the rotational position of wheel portion 22 on the supporting surface may include the steps of 502 indexing the one of the roller conveyor 56 and the conveyor 56 belt to a position underneath a camera 40 acquisition location and 504 capturing a wheel image using a camera 40 and processing a solution to guide placement of the at least one cover portion 24 onto the wheel portion 22. Then, the step of 104 retrieving the at least one cover portion 24 may include the step of 506 loading the at least one cover portion 24 onto a nest disposed on a first pedestal by at least one operator 38. The method may also include 508 signaling a first robot 48 (FIGS. 4-7) that the nest is populated by the at least one operator 38 and 510 coupling the nest with the first robot 48. Thus, the nesting can utilize a single load location for the at least one cover portion 24 by the at least one operator 38 onto the nest, or multiple nests (i.e., two minimum).

The step of 106 applying an adhesive to at least one of the back side 32 of the at least one cover portion 24 and the outboard face 26 of the wheel portion 22 in the fourth method may include the steps of 512 positioning the at least one cover portion 24 under a fix mounted adhesive dispenser 46 using the first robot 48 and 514 dispensing an appropriate adhesive pattern of a silicone adhesive on the back side 32 of the at least one cover portion 24. Next, 516 placing the nest onto a second pedestal and decoupling from the nest using the first robot 48 and 518 moving a second robot 50 (FIGS. 4-7 and 10) to the second pedestal. The fourth method can also include the steps of 520 acquiring the nest with the at least one cover portion 24 with the silicone adhesive using the second robot 50 and 522 positioning the nesting and the at least one cover portion 24 under one or more hot melt dispense nozzles 54 using the second robot 50. The fourth method can proceed by 524 applying hot melt adhesive in a pattern to the back side 32 of the at least one cover portion 24 for temporary fixturing of the at least one cover portion 24 to the wheel portion 22 using the second robot 50.

Therefore, the second robot 50 acquires the nest which is loaded with the at least one cover portion 24 that has silicone adhesive dispensed on them (for permanent attachment to wheel portion 22) and positions the nesting and at least one cover portion 24 under one or more hot melt dispense nozzles 54 to apply appropriate adhesive pattern (for temporary fixturing of the at least one cover portion 24 to the wheel portion 22).

In the fourth method, the second robot 50 then positions the nest with the at least one cover portion 24 onto the 'face side up' wheel portion 22. Thus, the step of 110 engaging the at least one cover portion 24 and the wheel portion 22 with one another and maintaining the wheel portion 22 in engagement with the at least one cover portion 24 for the predetermined amount of time with the predetermined amount of pressure to form the wheel assembly 20 may include the steps of 526 positioning the nest with the at least one cover portion 24 onto the outboard face 26 of the wheel portion 22 using the second robot 50 based on the wheel image and 528 pressing the at least one cover portion 24 down onto the outboard face 26 of the wheel portion 22 for the predetermined amount of time with the predetermined amount of pressure to form the wheel assembly 20. Next, 530 releasing the at least one cover portion 24 from the nest and lifting the nest straight up and away from the wheel assembly 20 and 532 moving the nest and depositing the nest onto the first pedestal. In other words, the second robot 50 with the nest presses the at least one cover portion 24 down onto the face up wheel portion 22 for an appropriate number of seconds and pressure, then releases the at least one cover portion 24 from the nest and lifts the nest straight up and away from the wheel portion 22 (leaving the at least one cover portion 24 assembled to the wheel portion 22), only to move the empty nesting and deposit it onto the first pedestal. This part of the process can be repeated.

The fourth method may also include the step of 534 utilizing camera 40 inspection of the at least one cover portion 24 and the wheel portion 22 prior to or after assembly of the at least one cover portion 24 to the wheel portion 22. The step of 112 moving the wheel assembly 20 from the work cell in the fourth method can include the step of 536 moving the wheel assembly 20 using the one of the roller conveyor 56 and the conveyor belt.

So, in the fourth method, for guided placement using the camera 40 of the at least one cover portion 24, the wheel portion 22 can be placed on the line face up (i.e., the outboard face 26 facing away from the supporting surface) and is sequenced to be positioned under the camera 40. The camera software acquires the wheel location X & Y location (i.e., planar position) and the rotational position and communicates the planar position and rotational position to a robot, which positions the at least one cover portion 24 onto the wheel portion 22 with accurate alignment. The second robot 50 can develop a downward force for a certain dwell time. The wheel portion 22 does not move during this phase of assembly. Additionally, if desired, the second robot 50 can decouple from the nesting (which can be of a sufficient weight to remove any minor warpage of the at least one cover portion 24), which provides additional time for the hot melt to develop adequate green strength to retain the at least one cover portion 24 in the design intent profile, before the second robot 50 comes back to couple to and remove the nesting from the wheel assembly 20. The nest or nesting can be built in additional quantities as needed to accommodate the necessary dwell time for adhesive 'green strength to develop' and yield additional finished pieces per hour. As mentioned above, camera 40 inspection can be used to ensure that the at least one cover portion 24 is loaded onto the nest and/or camera 40 inspection of cosmetic surfaces of the at least one cover portion 24 prior to or after assembly to the wheel portion 22.

Optionally if needed, additional nests can be provided which exhibit sufficient weight to remove any undulations/minor warpage in the at least one cover portion 24 and can stay positioned on top of the wheel portion 22 for adequate dwell time to allow for additional curing/tack and green strength of the adhesive. As mentioned, the second robot 50 can de-couple from nest, leaving it positioned on top of the wheel portion 22, then come back in a few minutes to remove the nesting straight up and away. The wheel portion 22 can index/move further on the line if necessary to accomplish this. Therefore, the fourth method can include the step of releasing the second robot 50 from the one of the plurality of nests in response to pressing the at least one cover portion 24 down onto the outboard face 26 of the wheel portion 22 to allow further dwell time. Next, connecting the second robot 50 to another one of the plurality of nests including another of the at least one cover portion 24. Then, the fourth method can continue by pressing the another of the at least one cover portion 24 down onto the outboard face 26 of another wheel portion 22 for the predetermined amount of time with the predetermined amount of pressure using the second robot 50 to form another wheel assembly 20. The method may also include the steps of releasing the second robot 50 from the another of the plurality of nests in response to pressing the another of the at least one cover portion 24 down onto the outboard face 26 of the another wheel portion 22 to allow further dwell time and coupling with the one of the plurality of nests and lifting the one of the plurality of nests straight up and away from the wheel assembly 20 using the second robot 50.

Figure 16A:
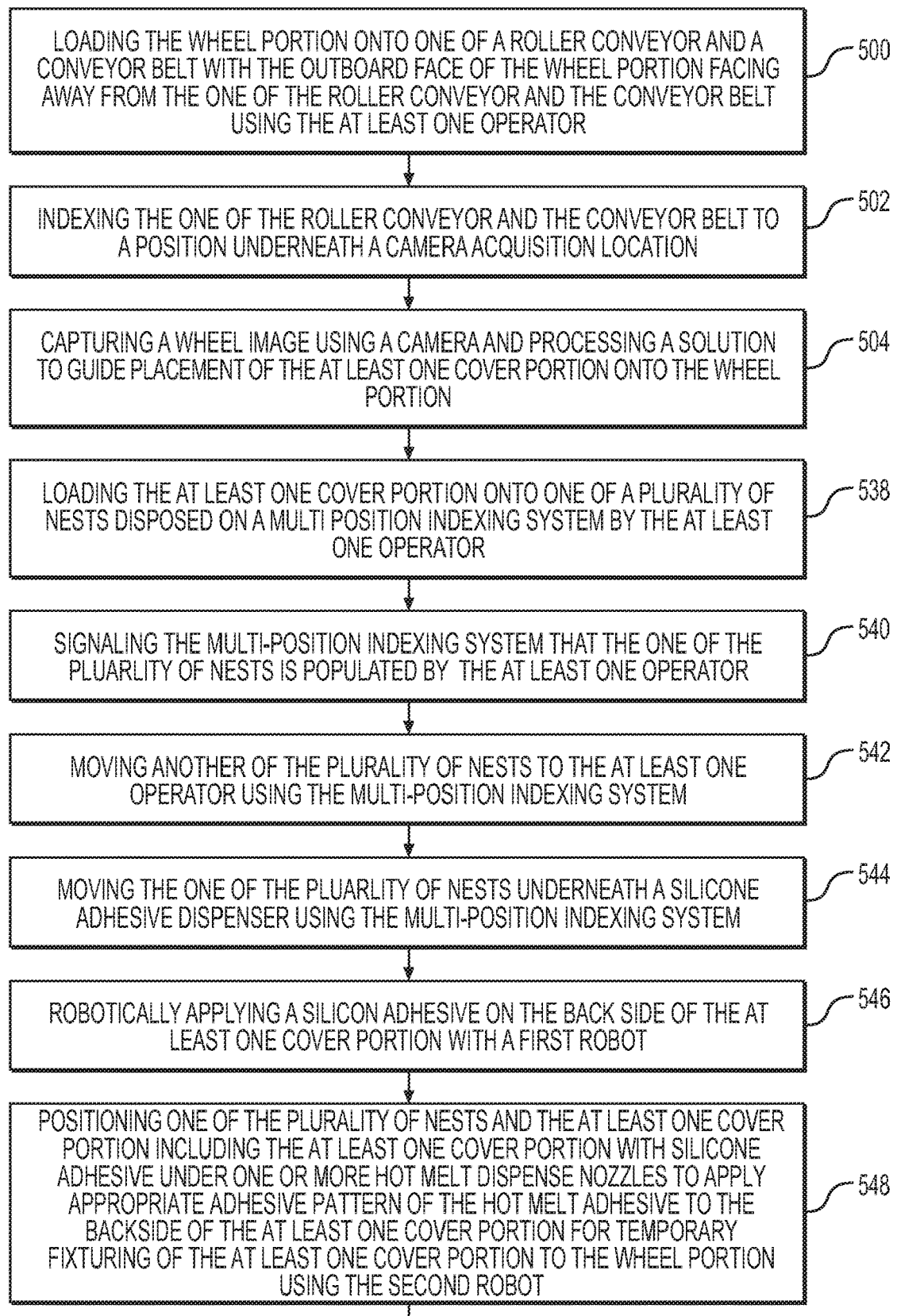
Figure 16B:
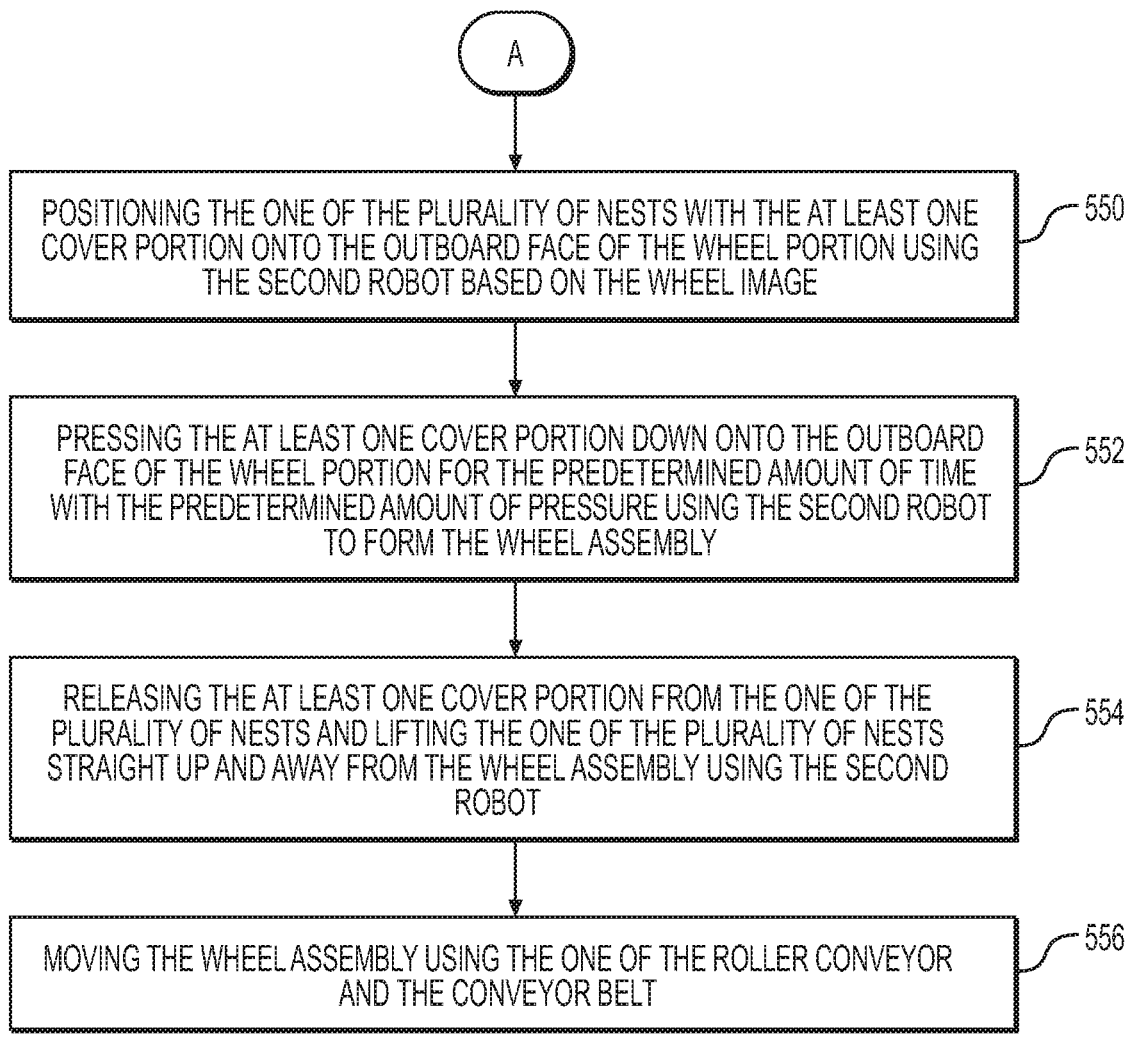

As an alternative to the nesting described above, the fourth method can utilize multiple nests and a multi-position indexing system (i.e., turntable 44) can be used to transfer the custom nesting in front of operator 38, into and out of the robotically applied silicone adhesive application portion of the work cell (adhesive dispense nozzle remains coupled to the first robot 48 at all times), and the turntable 44 indexes the nest for the second robot 50 to couple with. This allows for activities to occur concurrently, versus sequentially, enhancing throughput. The sequence for nesting in this case includes populating a nest with the at least one cover portion 24 by the operator 38 and signaling the indexing system to indicate that the nest is loaded. Therefore, as best shown in FIGS. 16A-16B, the step of 104 retrieving the at least one cover portion 24 may include the steps of 538 loading the at least one cover portion 24 onto one of a plurality of nests disposed on a multi-position indexing system by at least one operator 38 and 540 signaling the multi-position indexing system that the one of the plurality of nests is populated by the at least one operator 38. Next, 542 moving another of the plurality of nests (e.g., an empty nest) to the at least one operator 38 using the multi-position indexing system and 544 moving the one of the plurality of nests underneath a silicone adhesive dispenser using the multi-position indexing system. The fourth method can then include the steps of 546 robotically applying a silicon adhesive on the back side 32 of the at least one cover portion 24 (e.g., an adhesive 'pattern') with a first robot 48 and 548 positioning one of the plurality of nests and the at least one cover portion 24 including the at least one cover portion 24 with silicone adhesive under one or more hot melt dispense nozzles 54 to apply appropriate adhesive pattern of the hot melt adhesive to the back side 32 of the at least one cover portion 24 for temporary fixturing of the at least one cover portion 24 to the wheel portion 22 using the second robot 50.

The step of 110 engaging the at least one cover portion 24 and the wheel portion 22 with one another and maintaining the wheel portion 22 in engagement with the at least one cover portion 24 for the predetermined amount of time with the predetermined amount of pressure to form the wheel assembly 20 may include the steps of 550 positioning the one of the plurality of nests with the at least one cover portion 24 onto the outboard face 26 of the wheel portion 22 using the second robot 50 based on the wheel image and 552 pressing the at least one cover portion 24 down onto the outboard face 26 of the wheel portion 22 for the predetermined amount of time with the predetermined amount of pressure using the second robot 50 to form the wheel assembly 20. The fourth method may continue by 554 releasing the at least one cover portion 24 from the one of the plurality of nests and lifting the one of the plurality of nests straight up and away from the wheel assembly 20 using the second robot 50. Again, the step of 112 moving the wheel assembly 20 from the work cell can include the step of 556 moving the wheel assembly 20 using the one of the roller conveyor 56 and the conveyor 56 belt.

According to an aspect, the fourth method can include the step of applying adhesive to the face up wheel portion 22, (as described above using the first robot 48, and second robot 50). Then, stopping the wheel portion 22 underneath a camera 40 and determining the planar position and rotational position of the wheel portion 22 and communicating this orientation to the first robot 48 which applies the needed adhesive. Next, advancing the wheel portion 22 on the line and stopping underneath a second camera 40 which determines the planar position and rotational position of the wheel portion 22 and provides this information to the second robot 50. The method continues by placing the at least one cover portion 24 onto the wheel portion 22 for the appropriate dwell time and pressure. Such a method would utilize similar handling of the wheel portion 22 and camera 40 guided placement of the at least one cover portion 24 as described above.

Figure 17A:
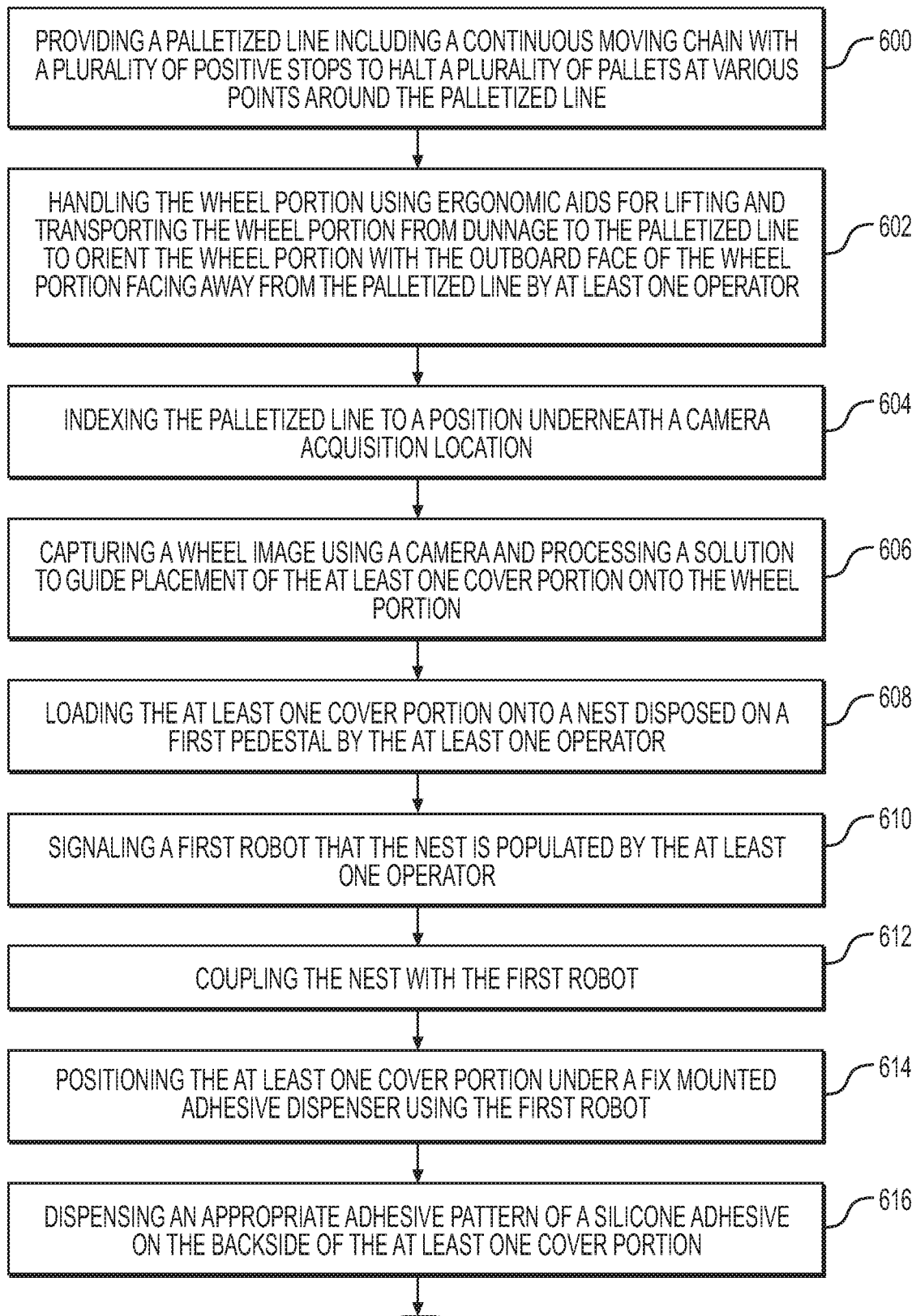
FIG. 17A-17B are flow charts illustrating steps of an exemplary fifth method of forming a wheel assembly according to aspects of the disclosure.
Figure 17B:
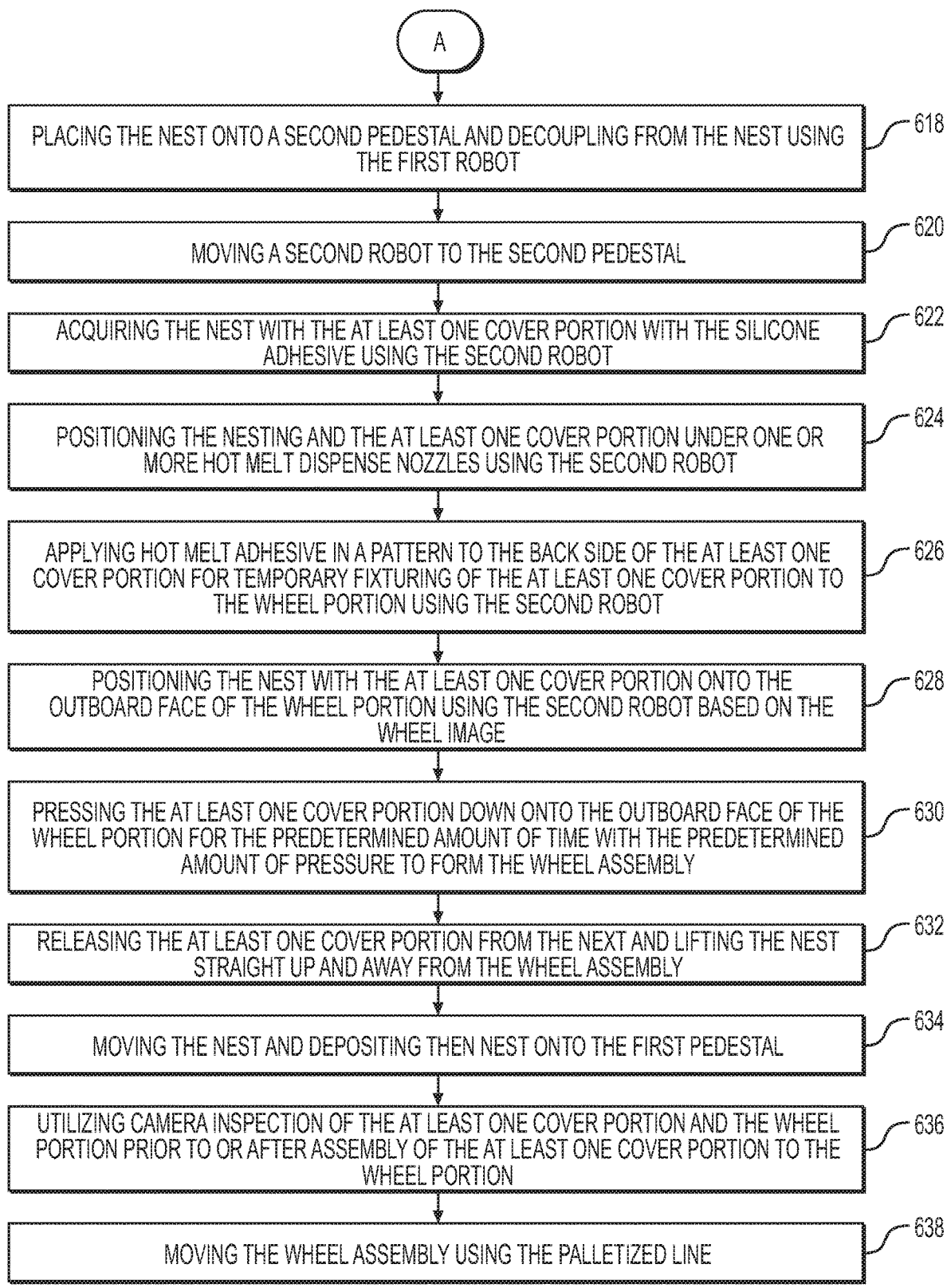

An exemplary fifth method according to aspects of the disclosure is also disclosed. As best shown in FIGS. 17A-17B, the fifth method can begin with the step of 600 providing a palletized line 58 (FIGS. 4 and 7) including a continuous moving chain with a plurality of positive stops to halt a plurality of pallets 60 at various points around the palletized line 58. This configuration may utilize straight linear transfers with degree corners. As described above, assembly operations can be occurring concurrently with multiple robots 42, 48, 50 and the at least one operator 38. Again, the handling the wheel portion 22 and/or wheel assembly 20 by the at least one operator 38 can include or may omit using varying degrees of ergonomic aids for lifting and transporting the wheel portion 22 from dunnage 34 to a work cell load area and from a work cell unload area to finished dunnage 36. So, the step of 100 handling the wheel portion 22 from dunnage 34 to a work cell to orient the wheel portion 22 with the outboard face 26 of the wheel portion 22 facing away from a supporting surface of the work cell in the fifth method can include the step of 602 handling the wheel portion 22 using ergonomic aids for lifting and transporting the wheel portion 22 from dunnage 34 to the palletized line 58 to orient the wheel portion 22 with the outboard face 26 of the wheel portion 22 facing away from the palletized line 58 by at least one operator 38.

In the fifth method, the step of 102 determining a planar position and the rotational position of wheel portion 22 on the supporting surface may include the steps of 604 indexing the palletized line 58 to a position underneath a camera 40 acquisition location and 606 capturing a wheel image using a camera 40 and processing a solution to guide placement of the at least one cover portion 24 onto the wheel portion 22. Then, the step of 104 retrieving the at least one cover portion 24 may include the step of 608 loading the at least one cover portion 24 onto a nest disposed on a first pedestal by the at least one operator 38. The method may also include 610 signaling a first robot 48 that the nest is populated by the at least one operator 38 and 612 coupling the nest with the first robot 48.

The step of 106 applying an adhesive to at least one of the back side 32 of the at least one cover portion 24 and the outboard face 26 of the wheel portion 22 in the fifth method may include the steps of 614 positioning the at least one cover portion 24 under a fix mounted adhesive dispenser 46 using the first robot 48 and 616 dispensing an appropriate adhesive pattern of a silicone adhesive on the back side 32 of the at least one cover portion 24. Next, 618 placing the nest onto a second pedestal and decoupling from the nest using the first robot 48 and 620 moving a second robot 50 to the second pedestal. The fifth method can also include the steps of 622 acquiring the nest with the at least one cover portion 24 with the silicone adhesive using the second robot 50 and 624 positioning the nesting and the at least one cover portion 24 under one or more hot melt dispense nozzles 54 using the second robot 50. The fifth method can proceed by 626 applying hot melt adhesive in a pattern to the back side 32 of the at least one cover portion 24 for temporary fixturing of the at least one cover portion 24 to the wheel portion 22 using the second robot 50.

In the fifth method, the second robot 50 then positions the nest with the at least one cover portion 24 onto the 'face side up' wheel portion 22. Thus, the step of 110 engaging the at least one cover portion 24 and the wheel portion 22 with one another and maintaining the wheel portion 22 in engagement with the at least one cover portion 24 for the predetermined amount of time with the predetermined amount of pressure to form the wheel assembly 20 may include the steps of 628 positioning the nest with the at least one cover portion 24 onto the outboard face 26 of the wheel portion 22 using the second robot 50 based on the wheel image and 630 pressing the at least one cover portion 24 down onto the outboard face 26 of the wheel portion 22 for the predetermined amount of time with the predetermined amount of pressure to form the wheel assembly 20. Next, 632 releasing the at least one cover portion 24 from the nest and lifting the nest straight up and away from the wheel assembly 20 and 634 moving the nest and depositing the nest onto the first pedestal.

Like the fourth method, the fifth method may also include the step of 636 utilizing camera 40 inspection of the at least one cover portion 24 and the wheel portion 22 prior to or after assembly of the at least one cover portion 24 to the wheel portion 22. The step of 638 moving the wheel assembly 20 from the work cell in the fifth method can include the step of moving the wheel assembly 20 using the palletized line 58.

For camera 40 guided placement of the at least one cover portion 24, the wheel portion 22 can be placed on the line (face up) and is sequenced to be positioned under a camera 40. The camera 40 software acquires the planar position (X & Y)/orientation (rotationally) and communicates the exact wheel location and rotational orientation to the robot (e.g., second robot 50) which positions the single or multiple cover portions 24 onto the wheel portion 22 with accurate alignment. The second robot 50 can develop a downward force for a certain dwell time. The wheel portion 22 does not move during this phase of assembly. Additionally, if desired, the second robot 50 can decouple from the nesting (which is of a sufficient weight to remove any minor warpage of the at least one cover portion 24), which provides additional time for the hot melt to develop adequate green strength to retain the at least one cover portion 24 in the design intent profile, before the second robot 50 comes back to couple to and remove the nesting from the wheel assembly 20. Again, the nesting can be built in additional quantities as needed to accommodate the necessary dwell time for adhesive 'green strength to develop' and yield additional finished pieces per hour. Alternatively, camera 40 inspection can be used to ensure that the at least one cover portion 24 is loaded onto EOAT 52 nesting and/or camera 40 inspection of cosmetic surfaces of the at least one cover portion 24 prior to or after assembly to the wheel portion 22.

Instead of the nesting described above, multiple nests and a multi position indexing system (i.e., turntable 44) can be used in the fifth method to transfer the custom nesting in front of operator 38, into and out of the robotically applied silicone adhesive application portion of the work cell (adhesive dispense nozzle remains coupled to the first robot 48 at all times), and the turntable 44 indexes the nesting for the second robot 50 to couple with. This allows for activities to occur concurrently, versus sequentially, enhancing throughput, as in the fourth method.

While the adhesive in the fifth method can be applied to the at least one cover portion 24, the fifth method could alternatively include steps in which the adhesive is applied to the face up wheel. So, according to an aspect, the fifth method can include the step of applying adhesive to the face up wheel portion 22, (as described above using two robots 42, 48, 50). Then, stopping the wheel portion 22 underneath a camera 40 and determining the X & Y (i.e., planar position) and rotational position of the wheel portion 22 and communicating this orientation or position to the first robot 48 which applies the needed adhesive. Next, advancing the wheel portion 22 on the line and stopping underneath a second camera 40 which determines the planar position and rotational position of the wheel portion 22 and provides information to the second robot 50. The method continues by placing the at least one cover portion 24 onto the wheel portion 22 for the appropriate dwell time and pressure. Such a method would utilize similar handling of the wheel portion 22 and camera 40 guided placement of the at least one cover portion 24 as described above for the fourth method.

Regarding the nesting location, two placement nests may be used that are intended to couple and decouple from the placement robot 42. Using a two position indexer, the operator 38 loads the at least one cover portion 24 onto a placement nest, the indexer 'indexes/rotates' which brings an empty nest to the operator 38, and a populated nest to the placement robot 42. The placement robot 42 couples with the placement nest and applies the at least one cover portion 24 to the face up wheel portion 22 for an appropriate dwell time and pressure. Then, the nest placement robot 42 lifts the empty placement nest straight up and away and the placement robot 42 returns the empty nest to the indexer and decouples from the nesting. This part of the process can then repeat. As discussed above, inspection may be carried out of the at least one cover portion 24 to ensure they are loaded onto a nest of the EOAT 52 or placement robot 42 and/or inspection of cosmetic surfaces of the at least one cover portions 24 using the camera 40 prior to or after assembly to the wheel portion 22 may also be utilized.

The methods described herein can advantageously eliminate the need to invert the wheel portions 22 upside down. Specifically, the wheel portions 22 are kept face up during entire assembly process. Wheel portions 22 are normally shipped from wheel companies in the face up condition (i.e., the outboard face facing away from the supporting surface) and thus would need to be inverted if the wheel portions are not kept face up. The methods also remove any need for thermal cure two component adhesive as well as the need to have to keep the at least one cover portion 24 clamped to the wheel portion until the adhesive is cured thermally. Because of this, the methods described eliminate a gas or electric oven that may ordinarily be needed for the thermal cure.

Additionally, the methods described do not require more expensive two component adhesive and associated mix tube expense and purging waste. Instead, the methods above use single component adhesives and no mixing of two component adhesives is necessary. The use of a single component reactive (non-thermal plastic) hot melt as temporary fixturing mechanism helps to minimize expensive and multiple 'fixturing' nests. Snap tabs for temporary fixturing (e.g., while the permanent adhesive cures) may not be required. This eliminates electrical contact of the at least one cover portion to the wheel portion and eliminates any potential for galvanic corrosion (e.g., between chrome plating and aluminum wheel portion, due to chlorides on the roads).

Additionally, clamp/unclamp stations in the assembly line, which are normally needed for palletized assembly, when assembling the at least one cover portion 24 in a method where the wheel portion 22 has to be placed upside down onto the at least one cover portion 24 are not required.

As described above, the methods can rely on camera guided robotics for accurately locating the at least one cover portion to the face up wheel portion, so no guess work as with upside down assembly is necessary. The assembly line can transport the wheel portions via either a simple belt conveyors and/or roller conveyors or palletized line with common pallet carriers that will accommodate wheel portions of differing diameters. Additionally, wheel portion un-load from dunnage 34 and back onto finished dunnage 36 can be accomplished with either manual human effort or relegated to robotics (no wheel portion 'inverting').

It can be appreciated that depending upon the amount of hot melt adhesive to be applied to complete one wheel assembly 20, that two (2) hot melt dispense robots may be required to keep the hot melt adhesive from pre-maturely cooling and hardening (which would prevent proper wet-out/distribution/leveling of the dispensed hot melt).

The foregoing invention has been described in accordance with the relevant legal standards, thus the description is exemplary rather than limiting in nature. Variations and modifications to the disclosed embodiment may become apparent to those skilled in the art and do come within the scope of the invention. Such variations are not to be regarded as a departure from the disclosure, and all such modifications are intended to be included within the scope of the disclosure. Those skilled in the art will recognize that concepts disclosed in association with the example methods can likewise be implemented into many other systems or methods. Accordingly, the scope of legal protection afforded this invention can only be determined by studying the following claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A method of forming a wheel assembly consisting of a wheel portion having an outboard face and an inboard face opposite the outboard face and at least one cover portion having a front side and a back side opposite the front side, comprising the steps of:
   handling the wheel portion from dunnage to a work cell to orient the wheel portion with the outboard face of the wheel portion facing away from a supporting surface of the work cell;
   determining a planar position and a rotational position of wheel portion on the supporting surface;
   retrieving the at least one cover portion;
   applying an adhesive including a first adhesive for fixturing and a second adhesive with cure properties slower than the first adhesive for permanent bonding to at least one of the back side of the at least one cover portion and the outboard face of the wheel portion;
   aligning the at least one cover portion with the wheel portion utilizing the planar position and the rotational position;
   engaging the at least one cover portion and the wheel portion with one another and maintaining the wheel portion in engagement with the at least one cover portion for a predetermined amount of time with a predetermined amount of pressure to form the wheel assembly; and
   moving the wheel assembly from the work cell.

2. The method as set forth in claim 1, wherein the step of determining a planar position and a rotational position of wheel portion on the supporting surface includes the steps of:
   acquiring the planar position and the rotational position of the wheel portion on the supporting surface using a camera; and
   communicating the planar position and the rotational position of the wheel portion to a placement robot.

3. The method as set forth in claim 2, wherein the step of retrieving the at least one cover portion includes the step of placing the at least one cover portion upside down in one of a plurality of nests adapted to couple with the placement robot and wherein the step of applying an adhesive including a first adhesive for fixturing and a second adhesive with cure properties slower than the first adhesive for permanent bonding to at least one of the back side of the at least one cover portion and the outboard face of the wheel portion_includes positioning the at least one cover portion using the placement robot under a fix mounted adhesive dispenser and applying the adhesive.

4. The method as set forth in claim 3, wherein the step of aligning the at least one cover portion with the wheel portion utilizing the planar position and the rotational position includes the step of aligning the at least one cover portion with the wheel portion using the planar position and the rotational position of the wheel portion from the camera and wherein the step of engaging the at least one cover portion and the wheel portion with one another and maintaining the wheel portion in engagement with the at least one cover portion for the predetermined amount of time with the predetermined amount of pressure to form the wheel assembly includes the step of applying the at least one cover portion to the wheel portion for the predetermined amount of time with the predetermined amount of pressure using the placement robot based on the planar position and the rotational position of the wheel portion.

5. The method as set forth in claim 3, wherein the step of placing the at least one cover portion upside down in one of a plurality of nests adapted to couple with the placement robot includes the steps of:
   providing a plurality of placement nests for coupling to and decoupling from the placement robot;
   loading the at least one cover portion onto one of the plurality of placement nests on a turntable using the at least one operator; and
   indexing the turntable to bring the one of the plurality of placement nests to the placement robot and an another of the plurality of placement nests to the operator in response to the loading the at least one cover portion onto one of the plurality of placement nests onto the turntable using the at least one operator.

6. The method as set forth in claim 1, wherein the step of handling the wheel portion from dunnage to a work cell to orient the wheel portion with the outboard face facing away from a supporting surface of the work cell includes handling the wheel portion from dunnage to the work cell to orient the wheel portion with the outboard face facing away from the supporting surface of the work cell by an operator.

7. The method as set forth in claim 1, wherein the step of handling the wheel portion from dunnage to a work cell to orient the wheel portion with the outboard face facing away from the supporting surface of the work cell includes the step of placing the wheel portion on a turntable using at least one operator and wherein the step of determining the planar position and the rotational position of wheel portion on the supporting surface includes the step of acquiring the planar position and the rotational position of the wheel portion on the turntable using a camera.

8. The method as set forth in claim 7, wherein the step of retrieving the at least one cover portion includes the steps of:
   placing the at least one cover portion in a pre-load nest with the back side of the at least one cover portion facing away from the pre-load nest;
   picking up the at least one cover portion from the pre-load nest with a transfer nest coupled to transfer end of arm tooling;
   traversing the transfer end of arm tooling using a rodless cylinder to a position above one of two placement nests connected to a trunion rotating shaft;
   lowering the at least one cover portion and depositing the at least one cover portion in a placement nest using the transfer end of arm tooling; and
   traversing the transfer nest upward and away from the placement nest and back to a home position.

9. The method as set forth in claim 8, wherein the step of applying an adhesive including a first adhesive for fixturing and a second adhesive with cure properties slower than the first adhesive for permanent bonding to at least one of the back side of the at least one cover portion and the outboard face of the wheel portion includes the steps of:
   dispensing the adhesive of one component room temperature vulcanizing followed by localized dispense of a hot melt localized onto the at least one cover portion in the placement nest;
   rotating the placement nest 180 degrees so that the back side of the at least one cover portion with adhesive is facing downward, and wherein the step of engaging the at least one cover portion and the wheel portion with one another and maintaining the wheel portion in engagement with the at least one cover portion for a predetermined amount of time with a predetermined amount of pressure to form the wheel assembly includes the steps of:
moving the wheel portion into position with a turntable directly underneath and aligned with the at least one cover portion;
forcing the wheel portion upward until the wheel portion engages the at least one cover portion to form a wheel assembly and maintaining the wheel portion in engagement with the at least one cover portion for the predetermined amount of time with the predetermined amount of pressure;
releasing the at least one cover portion in the placement nest;
lowering the wheel assembly back onto the turntable; and
indexing the turntable to bring the wheel assembly back to the at least one operator.

10. The method as set forth in claim 1, wherein the step of handling the wheel portion from dunnage to a work cell to orient the wheel portion with the outboard face facing away from the supporting surface of the work cell includes the step of loading the wheel portion onto one of a roller conveyor and a conveyor belt with the outboard face of the wheel portion facing away from the one of the roller conveyor and the conveyor belt and wherein the step of determining a planar position and the rotational position of wheel portion on the supporting surface includes the steps of:
indexing the one of the roller conveyor and the conveyor belt to a position underneath a camera acquisition location; and
capturing a wheel image using a camera and processing a solution to guide placement of the at least one cover portion onto the wheel portion.

11. The method as set forth in claim 10, wherein the step of retrieving the at least one cover portion includes the steps of:
loading the at least one cover portion onto a nest disposed on a first pedestal by at least one operator;
signaling a first robot that the nest is populated by the at least one operator;
coupling the nest with the first robot; and wherein the step of applying an adhesive to at least one of the back side of the at least one cover portion and the outboard face of the wheel portion includes the steps of:
positioning the at least one cover portion under a fix mounted adhesive dispenser using the first robot;
dispensing an appropriate adhesive pattern of a silicone adhesive on the back side of the at least one cover portion;
placing the nest onto a second pedestal and decoupling from the nest using the first robot;
moving a second robot to the second pedestal;
acquiring the nest with the at least one cover portion with the silicone adhesive using the second robot;
positioning the nesting and the at least one cover portion under one or more hot melt dispense nozzles using the second robot; and
applying hot melt adhesive in a pattern to the back side of the at least one cover portion for temporary fixturing of the at least one cover portion to the wheel portion using the second robot.

12. The method as set forth in claim 11, wherein the step of engaging the at least one cover portion and the wheel portion with one another and maintaining the wheel portion in engagement with the at least one cover portion for the predetermined amount of time with the predetermined amount of pressure to form the wheel assembly includes the steps of:
positioning the nest with the at least one cover portion onto the outboard face of the wheel portion using the second robot based on the wheel image;
pressing the at least one cover portion down onto the outboard face of the wheel portion for the predetermined amount of time with the predetermined amount of pressure to form the wheel assembly;
releasing the at least one cover portion from the nest and lifting the nest straight up and away from the wheel assembly; and
moving the nest and depositing the nest onto the first pedestal.

13. The method as set forth in claim 10 wherein the step of retrieving the at least one cover portion includes the steps of:
loading the at least one cover portion onto one of a plurality of nests disposed on a multi-position indexing system by at least one operator;
signaling the multi-position indexing system that the one of the plurality of nests is populated by the at least one operator;
moving another of the plurality of nests to the at least one operator using the multi-position indexing system;
moving the one of the plurality of nests underneath a silicone adhesive dispenser using the multi-position indexing system;
robotically applying a silicone adhesive on the back side of the at least one cover portion with a first robot;
positioning one of the plurality of nests and the at least one cover portion including the at least one cover portion with silicone adhesive under one or more hot melt dispense nozzles to apply an appropriate adhesive pattern of the hot melt adhesive to the back side of the at least one cover portion for temporary fixturing of the at least one cover portion to the wheel portion using the second robot.

14. The method as set forth in claim 13, wherein the step of engaging the at least one cover portion and the wheel portion with one another and maintaining the wheel portion in engagement with the at least one cover portion for the predetermined amount of time with the predetermined amount of pressure to form the wheel assembly includes the steps of:
positioning the one of the plurality of nests with the at least one cover portion onto the outboard face of the wheel portion using the second robot based on the wheel image;
pressing the at least one cover portion down onto the outboard face of the wheel portion for the predetermined amount of time with the predetermined amount of pressure using the second robot to form the wheel assembly; and
releasing the at least one cover portion from the one of the plurality of nests and lifting the one of the plurality of nests straight up and away from the wheel assembly using the second robot.

15. The method as set forth in claim 14, further including the steps of:
releasing the second robot from the one of the plurality of nests in response to pressing the at least one cover portion down onto the outboard face of the wheel portion to allow further dwell time;

connecting the second robot to another one of the plurality of nests including another of the at least one cover portion;

pressing the another of the at least one cover portion down onto the outboard face of another wheel portion for the predetermined amount of time with the predetermined amount of pressure using the second robot to form another wheel assembly;

releasing the second robot from the another of the plurality of nests in response to pressing the another of the at least one cover portion down onto the outboard face of the another wheel portion to allow further dwell time; and coupling with the one of the plurality of nests and lifting the one of the plurality of nests straight up and away from the wheel assembly using the second robot.

16. The method as set forth in claim 1, further including the step of utilizing camera inspection of one of the at least one cover portion and the wheel portion prior to or after assembly of the at least one cover portion to the wheel portion.

17. The method as set forth in claim 1, wherein the step of handling the wheel portion from dunnage to a work cell to orient the wheel portion with the outboard face facing away from a supporting surface of the work cell includes the step of providing a palletized line including a continuous moving chain with a plurality of positive stops to halt a plurality of pallets at various points around the palletized line.

18. The method as set forth in claim 1, wherein the step of handling the wheel portion from dunnage to a work cell to orient the wheel portion with the outboard face of the wheel portion facing away from a supporting surface of the work cell includes the step of handling the wheel portion using ergonomic aids for lifting and transporting the wheel portion from the dunnage to the work cell load area with the outboard face of the wheel portion facing away from the supporting surface of the work cell using at least one operator and wherein the step of moving the wheel assembly from the work cell includes the step of handling the wheel assembly using ergonomic aids for lifting and transporting the wheel assembly from a work cell unload area to a finished dunnage area.

19. The method as set forth in claim 1, wherein the step of handling the wheel portion from dunnage to the work cell to orient the wheel portion with the outboard face of the wheel portion facing away from the supporting surface of the work cell includes positioning the wheel portion by at least one operator with the aid of a camera.

20. The method as set forth in claim 1, wherein the first adhesive is a urethane hot melt adhesive and the second adhesive is a room temperature vulcanizing adhesive.

* * * * *